(12) United States Patent
Sastry et al.

(10) Patent No.: US 12,743,938 B1
(45) Date of Patent: Sep. 22, 2026

(54) SPEED-BASED IMAGE PROCESSING

(71) Applicant: SimpliSafe, Inc., Boston, MA (US)

(72) Inventors: Shekhar Bangalore Sastry, Arlington, MA (US); Shreyas Kamath Kalasa Mohandas, Sunnyvale, CA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 19/199,650

(22) Filed: May 6, 2025

(51) Int. Cl.
*G08B 13/196* (2006.01)
*G06T 7/254* (2017.01)

(52) U.S. Cl.
CPC ........ *G08B 13/19606* (2013.01); *G06T 7/254* (2017.01); *G06T 2207/10016* (2013.01); *G06T 2207/30232* (2013.01)

(58) Field of Classification Search
CPC .............. G08B 13/19606; G06T 7/254; G06T 2207/10016; G06T 2207/30232
See application file for complete search history.

(56) References Cited

U.S. PATENT DOCUMENTS

2015/0248590 A1* 9/2015 Li ........................ G06V 10/267
382/103
2018/0114421 A1* 4/2018 Siminoff .......... G08B 13/19684
2024/0338839 A1* 10/2024 Tolley .................. G08B 25/002

* cited by examiner

*Primary Examiner* — Jae N Noh
(74) *Attorney, Agent, or Firm* — Finch & Maloney PLLC

(57) ABSTRACT

In one example, a method includes aggregating two or more frames of a sequence of frames to produce a composite frame, the composite frame representing movement of a plurality of objects at different velocities, applying a threshold to the composite frame to produce a data set, the data set representing locations in the frames of one or more of the objects that are moving at a velocity below a limit, identifying from the data set at least one object of interest from among the one or more objects, and causing a security device to issue an alert responsive to identifying the at least one object of interest.

20 Claims, 16 Drawing Sheets

802

| D1 | D2 | D3 | D4 | D5 | D6 | D7 | D8 |
|---|---|---|---|---|---|---|---|
| D9 | D10 | D11 | D12 | D13 | D14 | D15 | D16 |
| D17 | D18 | D19 | D20 | D21 | D22 | D23 | D24 |
| D25 | D26 | D27 | D28 | D29 | D30 | D31 | D32 |
| D33 | D34 | D35 | D36 | D37 | D38 | D39 | D40 |
| D41 | D42 | D43 | D44 | D45 | D46 | D47 | D48 |
| D49 | D50 | D51 | D52 | D53 | D54 | D55 | D56 |
| D57 | D58 | D59 | D60 | D61 | D62 | D63 | D64 |

SPEED-BASED IMAGE PROCESSING

TECHNICAL FIELD

Aspects of the technologies described herein relate to systems and methods for image processing, more particularly, to motion-sensitive sensors and systems and methods utilizing the same.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to techniques for filtering small and fast-moving objects from motion-detection processes performed on video data. At least one example is directed to a method. The method includes aggregating two or more frames of a sequence of frames to produce a composite frame, the composite frame representing movement of a plurality of objects at different velocities, generating, from the composite frame a data set representing locations in the frames of one or more of the objects that are moving at a velocity below a limit, identifying from the data set at least one object of interest from among the one or more objects, and causing a security device to issue an alert responsive to identifying the at least one object of interest.

According to another example, a device comprises a camera, a frame buffer, a processor, and a non-transitory data storage device storing instructions that when executed by the processor cause the device to aggregate two or more frames of a sequence of frames to produce a composite frame, the composite frame representing movement of a plurality of objects at different velocities, and the sequence of frames containing data derived from a plurality of images acquired by the camera, apply a threshold to the composite frame to produce a data set, the data set representing locations in the images of one or more of the objects that are moving at a velocity below a limit, and identify from the data set at least one object of interest from among the one or more objects.

Another example is directed to a method comprising acquiring, with a camera, a plurality of images, producing, based on the plurality of images, a sequence of frames, individual frames having a plurality of first tiles with binary values derived from groupings of pixels of consecutive pairs of images from the plurality of images, summing the sequence of frames to produce a composite frame having a plurality of second tiles comparing values of the plurality of second tiles of the composite frame to a threshold, and detecting, based on the value of at least one second tile of the composite frame exceeding the threshold, a moving object depicted in one or more images of the plurality of images.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this disclosure. However, the figures are not intended as a definition of the limits of any particular example. The figures, together with the remainder of this disclosure, serve to explain principles and operations of the described and claimed aspects. In the figures, the same or similar components that are illustrated are represented by a like reference numeral. For purposes of clarity, every component may not be labeled in every figure. In the figures:

FIG. 8 is a diagram illustrating a difference image derived from the pair of images of FIG. 7, according to some examples described herein;

DETAILED DESCRIPTION

Figure 1:
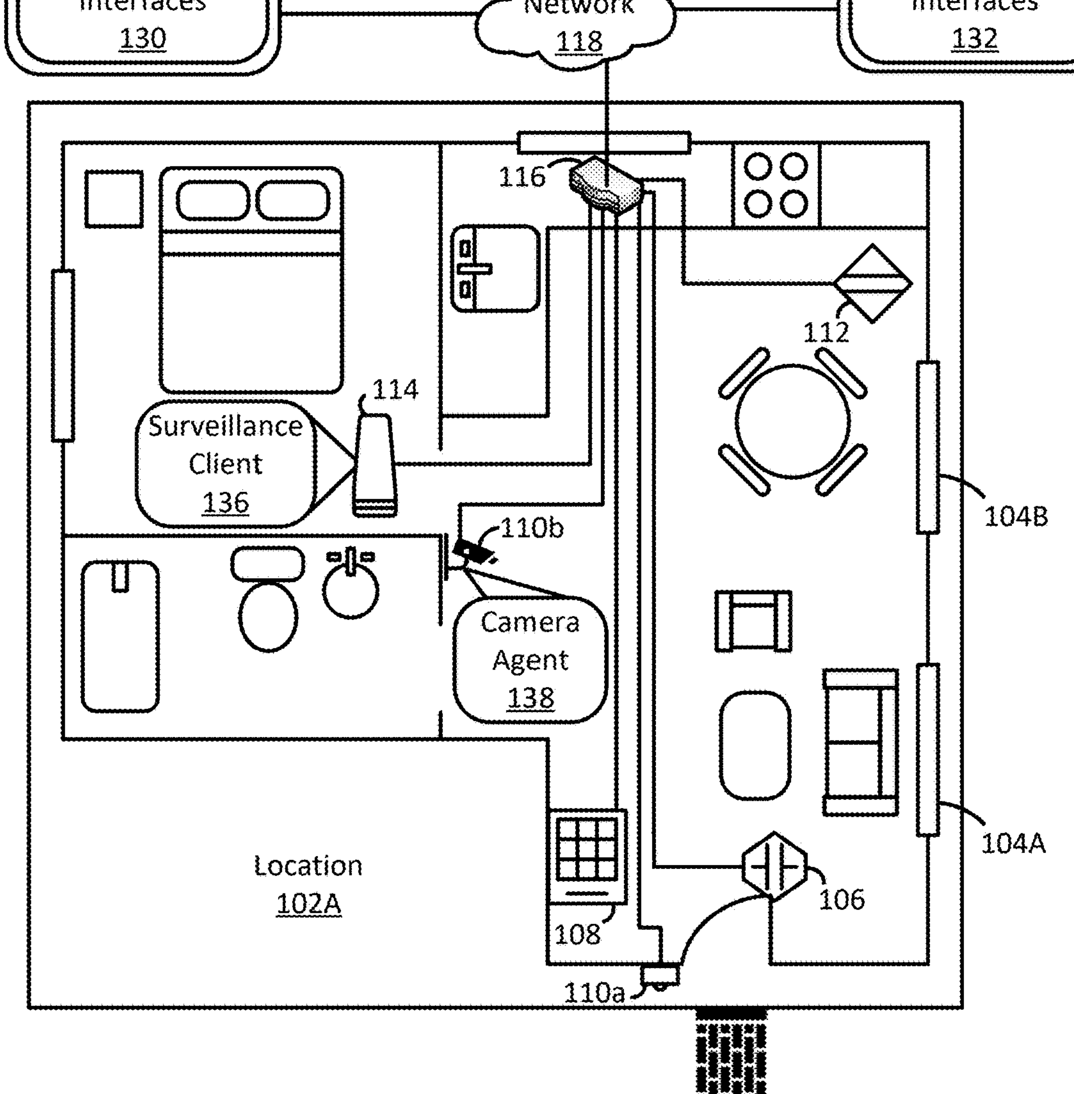
FIG. 1 is a schematic diagram of a security system, according to some examples described herein.

At least some examples disclosed herein are directed to systems, such as location-based monitoring systems or home security systems, in which one or more cameras or sensors are set up to monitor the premises. The system may utilize one or more cameras, also referred to as image capture devices, along with a base station, one or more sensors, and one or more user devices connected to a shared network. These devices can interoperate to allow a user, or other personnel, to monitor and/or be notified of occurrences of interest at the premises.

One occurrence of interest can be detection of motion at the premises. In particular, it can be desirable to have a monitoring system alert the user when moving objects of interest, such as people, vehicles, or sometimes animals, are detected at the premises. Motion detection can be accomplished by analyzing sequences of images acquired using a camera installed at a monitored location. For example, pixel-to-pixel comparisons between sequential images acquired with the camera can identify changes from one image to the next, and such changes can be indicative of moving objects. One method of motion detection involves using a camera to acquire sequential images (also referred to as image frames) and determining differences in the pixels between adjacent images to produce what is referenced to as a "difference image." Grouping or aggregating pixels in the difference image (referring to herein as "tiling") and applying a threshold to the groups of pixels (referred to as tiles) allows one to identify areas of significant change between the two adjacent images, and these areas can signify motion. This technique allows for the detection and location of moving objects. However, without additional steps, this approach does not distinguish between objects that are moving relatively slowly across the field of view of the camera and those that are moving relatively quickly across the field of view. Rather, because this approach detects motion by analyzing differences between adjacent frames, whether a moving object is small and fast or large and slow, differences appear between adjacent frames which may be interpreted as motion.

In the context of premises monitoring, detecting movement of larger objects that traverse the field of view of camera more slowly, such as people, vehicles, or animals, for example, may be of interest. In contrast, however, detection of movement of small objects that cross the field of view quickly, such as precipitation (e.g., rain, hail, or snow), dust, or insects, for example, can be a nuisance rather than of interest. Therefore, it can be desirable to configure a monitoring system to issue an alert when motion of an object of interest is detected (e.g., a positive alert), but not when motion of a nuisance object is detected (e.g., a false alert). Accordingly, examples described herein provide techniques for filtering out movement related to nuisance objects such as precipitation, dust, or insects, and reducing instances of false alerts caused by such objects. In some examples, sets of images (e.g., pairs of adjacent images, namely those taken at consecutive time intervals) acquired with a camera are converted to frames of image data using differencing and thresholding processes described further below. These frames of image data can then be aggregated to produce a composite frame (e.g., one representing a collection of frames of image data), which is then further processed (e.g., filtered) to capture/retain information representing movement of potential objects of interest (e.g., those that traverse the field of view of the camera relatively slowly) while removing (filtering out) other information that represents the movement of nuisance objects (e.g., those that traverse the field of view of the camera relatively quickly). A resulting data set can be analyzed/processed (e.g., by applying a further thresholding process) to determine whether it contains information representing motion of a potential object of interest. If motion is detected, an alert can be issued.

Accordingly, in one example, a method includes aggregating two or more frames of a sequence of frames to produce a composite frame. In some examples, the individual frames contain binary data that is derived from images captured by a camera, at least some of the images depicting moving objects within the camera's field of view. The composite frame may thus contain information representing movement of a plurality of objects at different velocities. In some examples, the method includes filtering the composite frame by applying a threshold to the composite frame to produce a data set. This threshold may be determined based at least in part on the speed at which various objects may traverse the field of view of the camera. Accordingly, in some examples, the data set represents locations in the frames of one or more of the objects that are moving at a velocity below a limit. The method may further comprise identifying from the data set at least one object of interest from among the one or more objects, and causing a security device to issue an alert based on identifying the at least one object of interest.

These and other aspects and examples are discussed in more detail below.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes various devices disposed at a monitored location 102A, a monitoring center environment 120, a data center environment 124, one or more customer devices 122, and a communication network 118. Each of the monitoring center environment 120, the data center environment 124, the one or more customer devices 122, and the communication network 118 include one or more computing devices (e.g., as described below with reference to FIG. 3). Some or all of the devices disposed at the monitored location 102A may also include one or more computing devices. The one or more customer devices 122 are configured to host one or more customer interface applications 132. The monitoring center environment 120 is configured to host one or more monitor interface applications 130. The data center environment 124 is configured to host a surveillance service 128 and one or more transport services 126. In some examples, devices at the monitored location 102A include one or more image capture devices 110 (individually identified as image capture devices 110*a* and 110*b* in FIG. 1), a contact sensor assembly 106, a keypad 108, a motion sensor assembly 112, a base station 114, and a router 116. The base station 114 hosts a surveillance client 136. The image capture device 110 hosts a camera agent 138. The security devices disposed at the monitored location 102A (e.g., devices 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the monitored location 102A by way of example only. Other networking technology that involves other computing devices is suitable for use within the location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc.). Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the monitored location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the monitored location 102A support other communication protocols, such as MQTT or other IoT protocols.

The data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, the data center environment 124 is configured to host the surveillance service 128 and the transport services 126.

In some examples, the monitoring center environment 120 can include a plurality of computing devices (e.g., desktop or laptop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. Where the image capture devices 110 have sufficient processing capacity and available power, the image capture devices 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device **110*a* has a field of view (FOV) that originates proximal to a front door of the location 102A and can acquire images of a walkway, highway, and a space between the location 102A and the highway. The image capture device 110*b* has an FOV that originates proximal to a bathroom of the location 102A and can acquire images of a living room and dining area of the location 102A. The image capture device 110*b* can further acquire images of outdoor areas beyond the location 102A through windows 104A and 104B on the right side of the location 102**A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 416 of FIG. 4). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate, to the base station 114, sensor data indicating whether the front door of the location 102A is open or closed. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of sensor data indicating changes in temperature rather than changes in reflected sound waves.

In some examples, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This aspect can prevent a "crash and smash" robbery from being successfully executed.

In some examples, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the monitor interface 130 controls its host device to interact with a user to configure aspects of the system 100. It should be noted that, in at least some examples, the monitor interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures aspects of the system 100 in response to input from a user.

Figure 2:
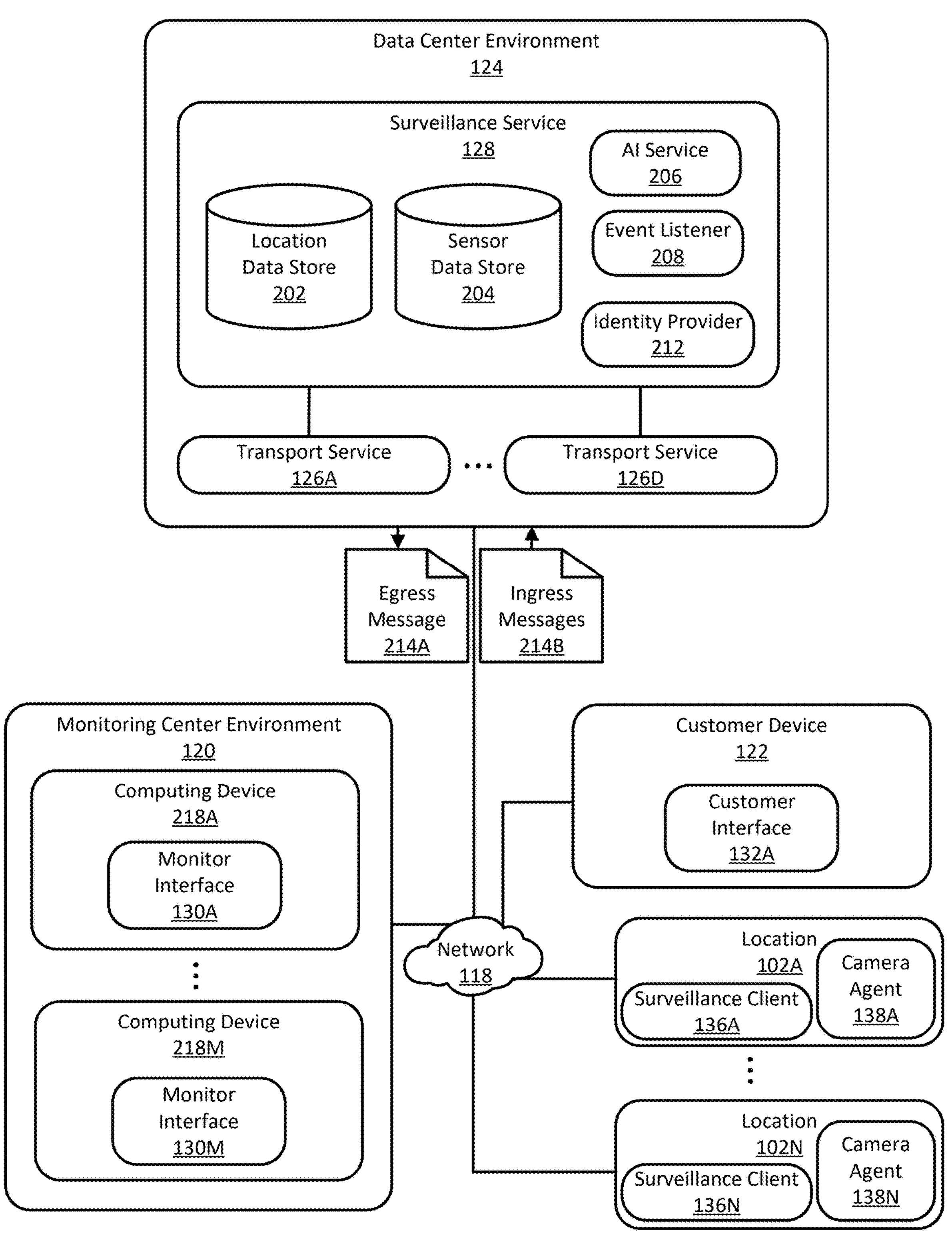
FIG. 2 is a schematic diagram of a data center environment, a monitoring center environment, and a customer device, according to some examples described herein.

Turning now to FIG. 2, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 2, the data center environment 124 hosts the surveillance service 128 and the transport services 126 (individually referred to as the transport services 126A through 126D). The surveillance service 128 includes a location data store 202, a sensor data store 204, an artificial intelligence (AI) service 206, an event listening service 208, and an identity provider 212. The monitoring center environment 120 includes computing devices 218A through 218M (collectively referred to as the computing devices 218) that host monitor interfaces 130A through 130M. Individual locations 102A through 102N may include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 2, the transport services 126 are configured to process ingress messages 214B from the customer interface 132A, the surveillance clients 136, the camera agents 138, and/or the monitor interfaces 130. The transport services 126 are also configured to process egress messages 214A addressed to the customer interface 132A, the surveillance clients 136, the camera agents 138, and the monitor interfaces 130. The location data store 202 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 204 is configured to store, within a plurality of records, sensor data (e.g., one or more frames of image data captured by the image capture device 110) separately from other location data but in association with identifiers of locations and timestamps at which the sensor data was acquired. In some examples, the sensor data store 204 is optional and may be use, for example, where the sensor data house therein has specialized storage or processing requirements. Images and data captured by image capture device 110 may be processed locally by the image capture device 110 and/or base station 114 or may be transferred to the data center environment 124 for processing.

Continuing with the example of FIG. 2, the AI service 206 is configured to process sensor data (e.g., images and/or sequences of images captured by an image capture device 110) to identify movement, human faces, and other features within the sensor data. The event listening service 208 is configured to scan location data transported via the ingress messages 214B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or a monitor interface 130). In some examples, the event listening service 208 can interoperate with the AI service 206 to identify events from sensor data. The identity provider 212 is configured to receive, via the transport services 126, authentication requests from the surveillance clients 136 or the camera agents 138 that include security credentials. When the identity provider 212 can authenticate the security credentials in a request (e.g., via a validation function, cross-reference look-up, or some other authentication process), the identity provider 212 can communicate a security token in response to the request. A surveillance client 136 or a camera agent 138 can receive, store, and include the security token in subsequent ingress messages 214B, so that the transport service 126A is able to securely process (e.g., unpack/parse) the packages included in the ingress messages 214B to extract the location data prior to passing the location data to the surveillance service 128.

Continuing with the example of FIG. 2, the transport services 126 are configured to receive the ingress messages 214B, verify the authenticity of the messages 214B, parse the messages 214B, and extract the location data encoded therein prior to passing the location data to the surveillance service 128 for processing. This location data can include any of the location data described above with reference to FIG. 1. Individual transport services 126 may be configured to process ingress messages 214B generated by location-based monitoring equipment of a particular manufacturer and/or model. The surveillance clients 136 and the camera agents 138 are configured to generate and communicate, to the surveillance service 128 via the network 118, ingress messages 214B that include packages of location data based on sensor information received at the locations 102.

Continuing with the example of FIG. 2, the computing devices 218 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data.

Figure 3:
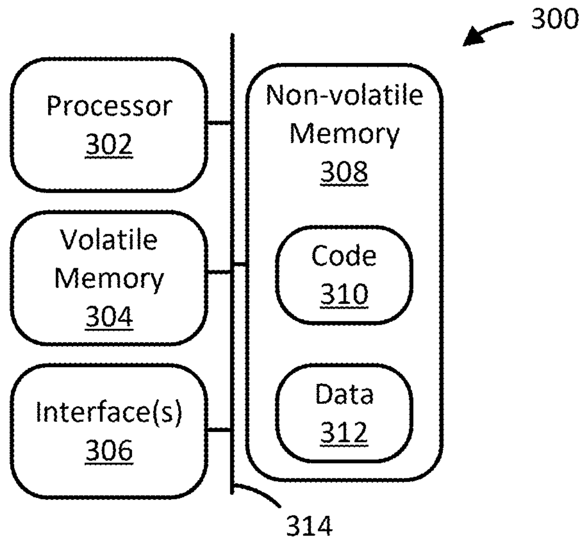
FIG. 3 is a schematic diagram of a computing device, according to some examples described herein.

Turning now to FIG. 3, a computing device 300 is illustrated schematically. As shown in FIG. 3, the computing device includes at least one processor 302, volatile memory 304, one or more interfaces 306, non-volatile memory 308, and an interconnection mechanism 314. The non-volatile memory 308 includes code 310 and at least one data store 312. As described above, examples of the computing device 300 may be part of any of the monitoring center environment 120, the data center environment 124, the one or more customer devices 122, the communication network 118, and/or any of the location-based devices, including the image capture device 110.

In some examples, the non-volatile (non-transitory) memory 308 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 310 stored in the non-volatile memory can include an operating system and one or more applications or programs that are configured to execute under the operating system. Alternatively or additionally, the code 310 can include specialized firmware and embedded software that is executable without dependence upon a commercially available operating system. Regardless, execution of the code 310 can result in manipulated data that may be stored in the data store 312 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing with the example of FIG. 3, the processor 302 can be one or more programmable processors to execute one or more executable instructions, such as a computer program specified by the code 310, to control the operations of the computing device 300. As used herein, and elsewhere in this document, the term “processor” describes circuitry that executes a function, an operation, or a sequence of operations. The function, operation, or sequence of operations can be hard coded into the circuitry or soft coded by way of instructions held in a memory device (e.g., the volatile memory 304) and executed by the circuitry. In some examples, the processor 302 is a digital processor, but the processor 302 can be analog, digital, or mixed. As such, the processor 302 can execute the function, operation, or sequence of operations using digital values and/or using analog signals. In some examples, the processor 302 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 302 that are multicore can provide functionality for parallel, simultaneous execution of instructions or for parallel, simultaneous execution of one instruction on more than one piece of data.

Continuing with the example of FIG. 3, prior to execution of the code 310 the processor 302 can copy the code 310 from the non-volatile memory 308 to the volatile memory 304. In some examples, the volatile memory 304 includes one or more static or dynamic random access memory (RAM) chips and/or cache memory (e.g. memory disposed on a silicon die of the processor 302). Volatile memory 304 can offer a faster response time than a main memory, such as the non-volatile memory 308.

Through execution of the code 310, the processor 302 can control operation of the interfaces 306. The interfaces 306 can include network interfaces, such as the network interface 406, described below, for example. These network interfaces can include one or more physical interfaces (e.g., a radio, an ethernet port, a USB port, etc.) and a software stack including drivers and/or other code 310 that is configured to communicate with the one or more physical interfaces to support one or more LAN, PAN, and/or WAN standard communication protocols. The communication protocols can include, for example, TCP and UDP among others. As such, the network interfaces enable the computing device 300 to access and communicate with other computing devices via a computer network.

Figure 4:
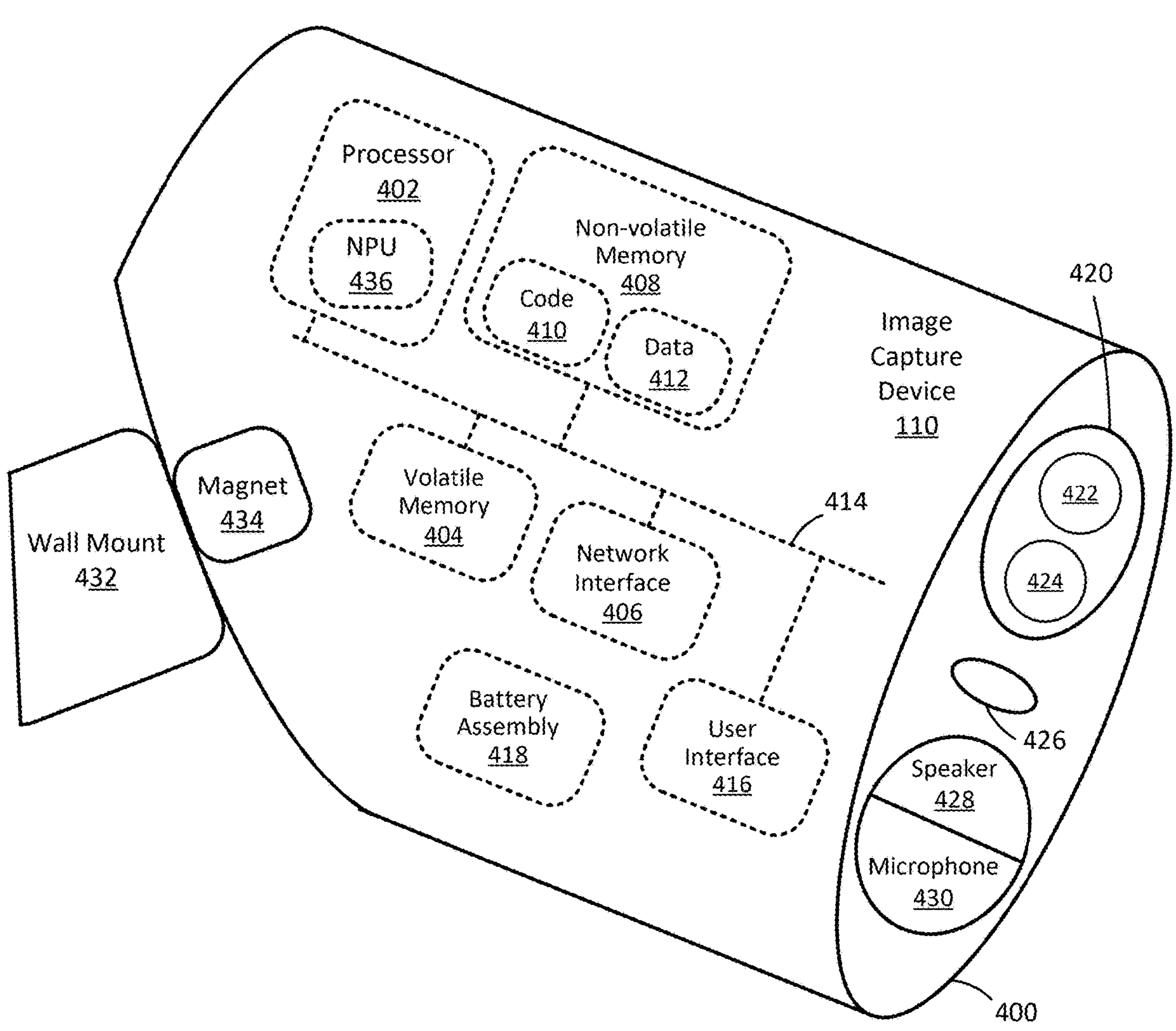
FIG. 4 is a schematic diagram of an image capture device, according to some examples described herein.

Continuing with the example of FIG. 3, the interfaces 306 can include user interfaces, such as the user interface 416 of FIG. 4. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 310 that is configured to communicate with the user input and/or output devices. As such, the user interfaces enable the computing device 300 to interact with users to receive input and/or render output. This rendered output can include, for instance, one or more GUIs including one or more controls configured to display output and/or receive input. The input can specify values to be stored in the data store 312. The output can indicate values stored in the data store 312.

The various aspects of the computing device 300 described above can communicate with one another via the interconnection mechanism 314. In some examples, the interconnection mechanism 314 includes a communications bus.

Turning now to FIG. 4, an example of the image capture device 110 is schematically illustrated. The image capture device 110 may be a battery-powered outdoor sensor configured to be installed and operated in an outdoor environment, such as outside a home, office, store, or other commercial or residential building, for example. The image capture device 110 may instantiate the image capture devices 110*a* and/or 110*b* illustrated in FIG. 1. It will further be appreciated that in some applications, the image capture device 110 need not serve a security function and/or may be part of a smart home system or device that is not part of a security system. Accordingly, examples and aspects of the image capture device 110 described herein are not limited to security systems and/or security applications.

As shown in FIG. 4, in some examples, the image capture device 110 includes at least one processor 402, volatile memory 404, non-volatile memory 408, at least one network interface 406, a battery assembly 418, a user interface 416, and an interconnection mechanism 414. These components of the image capture device 110 are illustrated in dashed lines to indicate that they reside within a housing 400. The non-volatile memory 408 stores executable code 410 and data 412. In some examples, as described above, prior to execution of the code 410, the processor 402 can copy the code 410 from the non-volatile memory 408 to the volatile memory 404. Some examples of the image capture device 110 further include a sensor assembly 420. Some examples further include a light source 426, a speaker 428, a microphone 430, a wall mount 432, and a magnet 434. The sensor assembly 420 may include an image sensor 424 (e.g., a charge-coupled device or an active-pixel sensor) and/or a temperature or thermographic sensor (e.g., an active and/or passive infrared (PIR) sensor 422). The light source 426 may include a light emitting diode (LED), such as a red-green-blue emitting LED. The light source 426 may also include an infrared emitting diode in some examples. The speaker 428 may include a transducer configured to emit sound in the range of 50 dB to 80 dB or louder. Further, in some examples, the speaker 428 can include a siren configured to emit sound in the range of 70 dB to 90 dB or louder. The microphone 430 may include a micro electro-mechanical system (MEMS) microphone. The wall mount 432 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 434 to magnetically couple to the wall mount 432, thereby holding the image capture device 110 in place.

In some examples, the respective descriptions of the processor 302, the volatile memory 304, the non-volatile memory 308, and the interconnection mechanism 314 with respect to the computing device 300 are applicable to the processor 402, the volatile memory 404, the non-volatile memory 408, and the interconnection mechanism 414, respectively. As such, those descriptions are not repeated here. In certain examples, the code 410 stored in the non-volatile memory 408 can include an operating system and one or more applications or programs that are configured to execute under the operating system. Alternatively or additionally, the code 410 can include specialized firmware and embedded software that is executable without dependence upon a commercially available operating system.

Continuing with the example of FIG. 4, through execution of the code 410, the processor 402 can control operation of the network interface 406. In some examples, the network interface 406 includes one or more physical interfaces (e.g., a radio (including an antenna), an ethernet port, a USB port, etc.) and a software stack including drivers and/or other code 410 that is configured to communicate with the one or more physical interfaces to support one or more LAN, PAN, and/or WAN standard communication protocols, as described above. The communication protocols can include, for example, TCP, UDP, HTTP, and MQTT among others. As such, the network interface 406 enables the image capture device 110 to access and communicate with other computing devices (e.g., the other location-based devices) via a computer network (e.g., the LAN established by the router 116 of FIG. 1, the network 118 of FIG. 1, and/or a point-to-point connection). For instance, in at least one example, when executing the code 410, the processor 402 controls the network interface to stream (e.g., via UDP) sensor data acquired from the sensor assembly 420 to the base station 114. In at least one example, the network interface 406 utilizes sub-GHz wireless networking to transmit messages to other location-based devices. These messages can include wake messages to request streams of sensor data, alarm messages to trigger alarm responses, or other messages to initiate other operations For example, through execution of the code 410, the processor 402 can control the network interface 406 to enter a power conservation mode by powering down a 2.4 GHz radio and powering up a sub-GHz radio that are both included in the network interface 406. In this example, through execution of the code 410, the processor 402 can control the network interface 406 to enter a streaming or interactive mode by powering up a 2.4 GHz radio and powering down a sub-GHz radio, for example, in response to receiving a wake signal from the base station via the sub-GHz radio. Bands that the network interface 406 may utilize for sub-GHz wireless networking include, for example, an 868 MHz band and/or a 915 MHz band. Use of sub-GHz wireless networking can improve operable communication distances and/or reduce power consumed to communicate.

Continuing with the example of FIG. 4, the various components of the image capture device 110 described above can communicate with one another via the interconnection mechanism 414, as described above. Although not illustrated in FIG. 4, it will be appreciated that the sensor assembly 420, the light source 426, the speaker 428 and/or the microphone 430 may also be coupled to the processor 402 via the interconnection mechanism 414. Further, although illustrated separately, the speaker 428, light source 426, and/or the microphone 430 may form part of the user interface 416.

In some examples, the battery assembly 418 is configured to supply operational power to the various components of the image capture device 110 described above. In some examples, the battery assembly 418 includes at least one rechargeable battery (e.g., one or more NiMH or lithium batteries). In some examples, the rechargeable battery has a runtime capacity sufficient to operate the image capture device 110 for 24 hours or longer while the image capture device 110 is disconnected from or otherwise not receiving line power. Alternatively or additionally, in some examples, the battery assembly 418 includes power supply circuitry to receive, condition, and distribute line power to both operate the image capture device 110 and recharge the rechargeable battery. The power supply circuitry can include, for example, a transformer and a rectifier, among other circuitry, to convert AC line power to DC device and recharging power.

Through execution of the code 410, the processor 402 can control operation of the image sensor assembly 420, the light source 426, the speaker 428, and the microphone 430. For instance, in at least one example, when executing the code 410, the processor 402 controls the image sensor assembly 420 to acquire sensor data, in the form of image data, that can be streamed to the base station 114 (or one of the processes 130, 128, or 132 of FIG. 1) via the network interface 406, as described above. In some examples, the image sensor 424 is configured to capture images in one or more spectral bands of the electromagnetic spectrum. In some examples, the image sensor 424 collects still image frames and/or video image frames constituting a video feed/stream. The image sensor 424 may operate in the visible spectral band and/or the infrared spectral band, for example. In at least one example, through execution of the code 410, the processor 402 controls the light source 426 to emit light so that the image sensor assembly 420 collects sufficient reflected light to compose the image data.

Further, in some examples, through execution of the code 410, the processor 402 controls the speaker 428 to emit sound. This sound may be locally generated (e.g., a sonic alarm via the siren) or may be streamed from the base station 114 (or one of the processes 130, 128 or 132 of FIG. 1) via the network interface 406 (e.g., utterances from the user or monitoring personnel). Further still, in some examples, through execution of the code 410, the processor 402 may control the microphone 430 to acquire sensor data in the form of sound for streaming to the base station 114 (or one of the processes 130, 128 or 132 of FIG. 1) via the network interface 406.

As described above, in some examples, the sensor assembly 420 includes the image sensor 424 and the PIR sensor 422. In one example, the PIR sensor 422 operates as a motion detector. PIR sensors are motion sensors that detect changes in temperature over a predetermined field of view. The PIR sensor 422 can be configured with a threshold such that any change larger than the threshold constitutes motion and causes the image capture device 110 to take some further action, such as issuing an alert and/or communicating information to the base station 114. In some examples, the PIR sensor 424 can be tuned to detect people and/or animals based on a known temperature range associated with the body temperatures of people and/or animals.

According to certain examples, the image capture device 110 operates in a low power state (operating mode) in which the image sensor 424 (and optionally other components of the image capture device 110, such as the light source 426, for example) are deactivated until motion is detected by the PIR sensor 422. Thus, in some examples, the PIR sensor 422 remains active in the low power operating mode, but components that generally consume more power, such as the image sensor 424, for example, are powered off. In the low power operating mode, the processor 402 may perform minimal processing, sufficient to monitor for events that trigger the PIR sensor 422. When the PIR sensor 422 indicates motion and issues a signal or notification (e.g., sends a motion trigger signal to the processor 402), the processor 402 is placed into a normal operating mode, in which the image sensor 424 (along with any other components of the image capture device 110 that are powered off in the low power mode) is enabled. Thus, the PIR sensor 422 can act as a mode "switch" that configures the image capture device 110 into the "full power" or normal operating mode only when necessary. In this manner, power can be conserved by operating the image capture device 110*d* in the low power mode, with various components powered off, until a potential event of interest is detected.

Once active, the image sensor 424 captures one or more frames of image data. In some examples, the image sensor 424 passes the frame(s) of image data ("images" or "image frames") to the processor 402 for processing. In some examples, the processor 402 applies a motion detection process to the captured image frames to detect moving objects, which may then be identified as either objects of interest (e.g., people), detection of which may cause the image capture device 110*d* to issue an alert, or benign objects that can be safely ignored. Motion detection is the process of detecting a change in position of an object relative to its surroundings or a change in the surroundings relative to an object. As described above, motion detection based on image processing can be performed by computing the pixel-to-pixel difference in intensity between consecutive frames to create a difference image and then applying a threshold to the difference image. In certain examples, any difference values larger than the threshold constitute motion.

Still referring to FIG. 4, in some examples, the processor 402 includes a neural processing unit (NPU) 436 for efficiently running neural networks to perform aspects of a motion detection process based on the image frames captured by the image sensor 424. In some examples, the image capture device 110 is capable of detecting and distinguishing between certain objects, such as people or pets for example, in the image frames captured by the image sensor 424. The image capture device 110 can be further configured to communicate an object detection event if an object of interest is identified. The image capture device 110 can use any of a variety of techniques to locate and recognize objects in an image frame. For example, computer vision based object detection can use specialized filters for locating different attributes or features within an image frame and then combining the features to classify whether or not a particular category of object is found. For example, an object detector can locate all human faces in a frame. In some examples, the NPU 436 can be configured to implement machine learning based processes or models that are trained on a vast number of images containing objects of interest to recognize similar objects in new or previously unseen images. In addition, examples of the image capture device 110 are configured to detect motion relative to recognized objects.

In some examples, some or all of the image processing described herein may be performed by the processor 402. In some examples, the image capture device 110 can transmit (e.g., via the network interface 406) processed and/or unprocessed images, or summaries thereof, from the sensor assembly 420 to a remote device for (further) processing and/or analysis.

As described above, while detecting motion of potential objects of interest (e.g., people, vehicles, etc.), and issuing alerts in response thereto, can be a useful and beneficial feature of automated location monitoring systems, false alerts caused by detecting motion of nuisance objects (e.g., precipitation, insects, etc.) can be distracting and annoying. In some instances, the speed at which an object traverses the field of view of the image capture device 110 can be an indicator as to whether the object may be an object of interest or a nuisance object. For example, larger objects, such as people, vehicles, and larger animals, can be imaged when they are further away from the image capture device (e.g., if an image capture device is mounted on a wall, it may capture images of people or cars that are located several yards, or tens of yards, away from the wall). As a result, these larger objects may tend to traverse the field of view of the image capture device 110 relatively slowly. In contrast, small objects, such as insects, dust particles, or precipitation, may only be imaged when they are very close to the image capture device (e.g., a few inches or fraction of inches away), and as such, tend to traverse the field of view of the image capture device 110 relatively quickly. Accordingly, examples disclosed herein employ techniques for speed-based filtering in image processing such that motion detection processes can discriminate between slow and fast moving objects. Using the techniques described herein, smaller, fast-moving objects can be filtered out such that motion detection can be based on larger, slow-moving objects only, thus reducing instances of false alerts otherwise caused by the smaller, fast-moving objects.

Figure 5A:
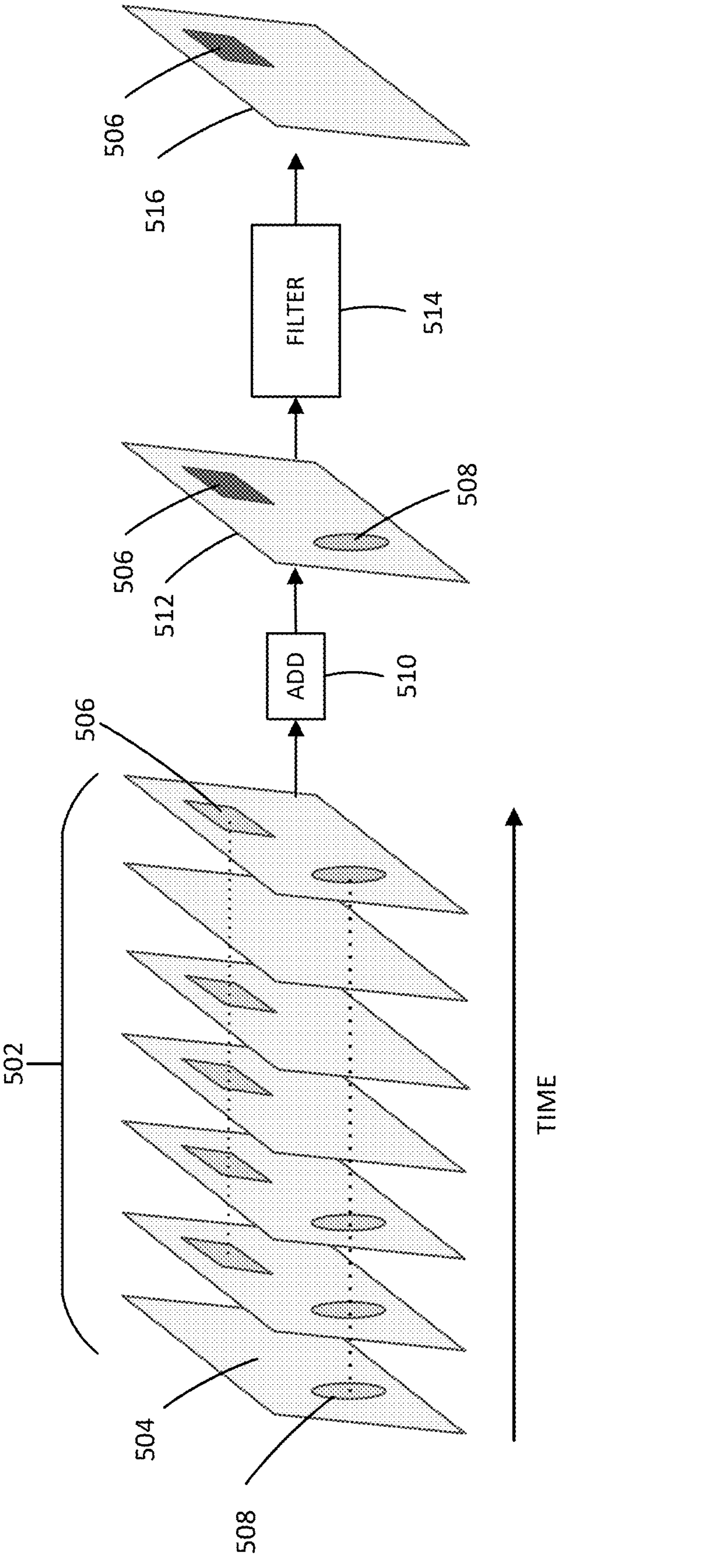
FIG. 5A is a diagram illustrating aspects of speed-based image processing, according to some examples described herein.
Figure 5B:
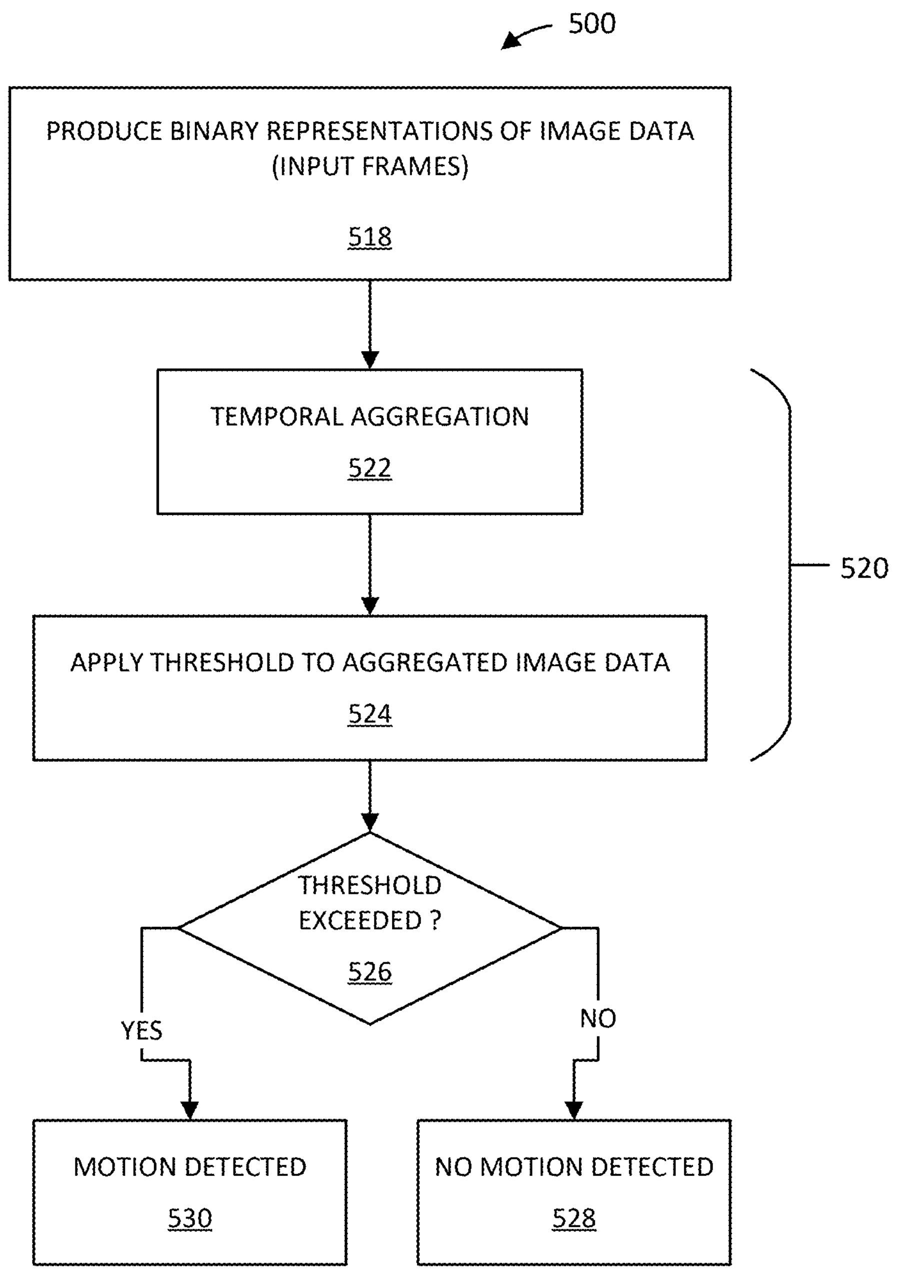
FIG. 5B is a flow diagram of a method of motion detection, according to some examples described herein.

Referring to FIGS. 5A and 5B, illustrated are a conceptual diagram (FIG. 5A) and a flow diagram (FIG. 5B) of a method of motion detection that includes speed-based image processing according to certain examples. Referring to FIG. 5A, in some examples, the method includes aggregating (illustrated by add operation 510) information derived from a sequence 502 of images 504, and using the aggregated information 512 for motion detection, as described further below. The plurality of images 504 can be acquired over time using the image capture device 110, for example. Various objects, which may be moving at different velocities, may be depicted in some or all of the images 504 in the sequence 502. In the example illustrated in FIG. 5A, at least some of the images 504 depict a first object 506 and/or a second object 508. The first object 506 may be a relatively slow-moving object, whereas the second object 508 is a relatively fast-moving object. Accordingly, as the first object 506 takes longer to traverse the field of view of the image capture device 110, it may be depicted in more images 504 than is the fast-moving object 508, as shown. It will be appreciated that, as used herein, the terms "fast-moving" and "slow-moving" refer to the speed at which a particular object moves across the field of view of the image capture device, and not necessarily to an actual or absolute speed of movement of the object in real space.

As described above, in at least some contexts and/or applications, the first (slow-moving) object 506 may be more likely to represent an object of interest than is the second (fast-moving) object 508. In general, larger objects that are further away from the image capture device (e.g., people, vehicles, etc.) may move more slowly across the field of view of the image capture device than do very small particles that are close to the image capture device (e.g., dust, rain, insects, etc.). In some monitoring systems, the motion of such relatively slow-moving objects, such as individuals or vehicles, may be of more interest for, for instance, for tracking individuals entering or leaving a location. Accordingly, at operation 514, the aggregated information 512 derived from the sequence 502 of images 504 is processed (e.g., filtered) to exclude the second object 508. Thus, a data set 516 of information that is produced from the aggregation (add) 510 and filtering 514 operations (examples of which are described in more detail below) may include information representing only the first object 506 and not the second object 508, as shown in FIG. 5A. Accordingly, a motion detection process applied to the data set 516 may detect motion of the first object 506. A monitoring system applying the processes and techniques disclosed herein may thus issue an alert based on detecting the motion of the first object 506. However, since the second object 508 has been processed (e.g., filtered) out of the data set 516 that is then processed for motion detection, false alerts that could otherwise be triggered by detection of movement of the second object 508 can be avoided (or at least reduced).

Turning to FIG. 5B, a corresponding method 500 of motion detection is depicted in the form of a flow diagram. The method 500 can be executed, in some examples, by a processor, including the processor 302 of FIG. 3 or the processor 402 of FIG. 4, as well as processors inside other devices, such as the base station 114, the customer device 132, or the computing device 218.

As shown in FIG. 5B, the method 500 includes an operation 518 of producing binary representations of image data. The image data may be derived from the plurality of images 504 collected by the image capture device 110. The image data may or may not be processed prior to producing the binary representations of the image data at operation 518. According to certain examples, an individual binary representation is a two-dimensional matrix of binary values (e.g., logical 1s and logical 0s), with the binary values being derived from the underlying image data. An example of a process for producing the binary representations of image data at operation 518 is described below with reference to FIG. 6. The binary representations of the image data produced at operation 518 form "input frames" to which temporal filtering is applied at operation 520, as described further below.

According to certain examples, rather than applying the processes of aggregation/addition (e.g., operation 510) and filtering (e.g. operation 514) directly to the images 504, these operations are applied to data that is derived from the images 504. As described above, in some examples, motion detection can involve determining pixel-to-pixel difference in intensity between consecutive images to create a difference image and then applying a threshold to the difference image. According to certain examples, producing the difference image can be performed as part of operation 518, as described further below. Operation 518 may include further processing multiple difference images to produce a set of binary representations of image data, as is described in further detail below with reference to FIGS. 6-10B. These binary representations of image data, referred to herein as input frames 610, can then be aggregated and processed (e.g., filtered) to produce the data set 516.

Continuing with the example of FIG. 5B, at operation 522 (temporal aggregation), a plurality of input frames within a defined window can be added together. The window may be defined in terms of time (e.g. 1 second, 5 seconds, 1 minute, etc.), in terms of size (4 frames, 10 frames, 50 frames, etc.), or both. This operation 522 of temporal aggregation corresponds to the addition/aggregation concept represented by operation 510 in FIG. 5A. At operation 524, the aggregated image data produced at operation 522 (referred to herein as a composite frame) can be processed (e.g., filtered) by applying a threshold to the aggregated image data. This thresholding operation 524 corresponds to the filtering concept represented by operation 514 in FIG. 5A. Together, operations 522 and 524 constitute a temporal filtering process 520, examples of which are described further below with reference to FIGS. 11-14.

In some examples, motion detection can be based on whether or not individual portions of the aggregated image data have associated values that exceed the threshold applied at operation 524. As described further below with reference to FIG. 6, the aggregated image data can be divided into a plurality of tiles, individual tiles having a value that represents information derived from a group of pixels in underlying difference images used to produce the input frames at operation 518. The method 500 may include, at operation 526, determining whether the values of individual tiles exceed the threshold or not. In some examples, for any given tile, motion is detected if the threshold is exceeded (state 530), whereas no motion is detected (state 528) if the threshold is not met.

Figure 6:
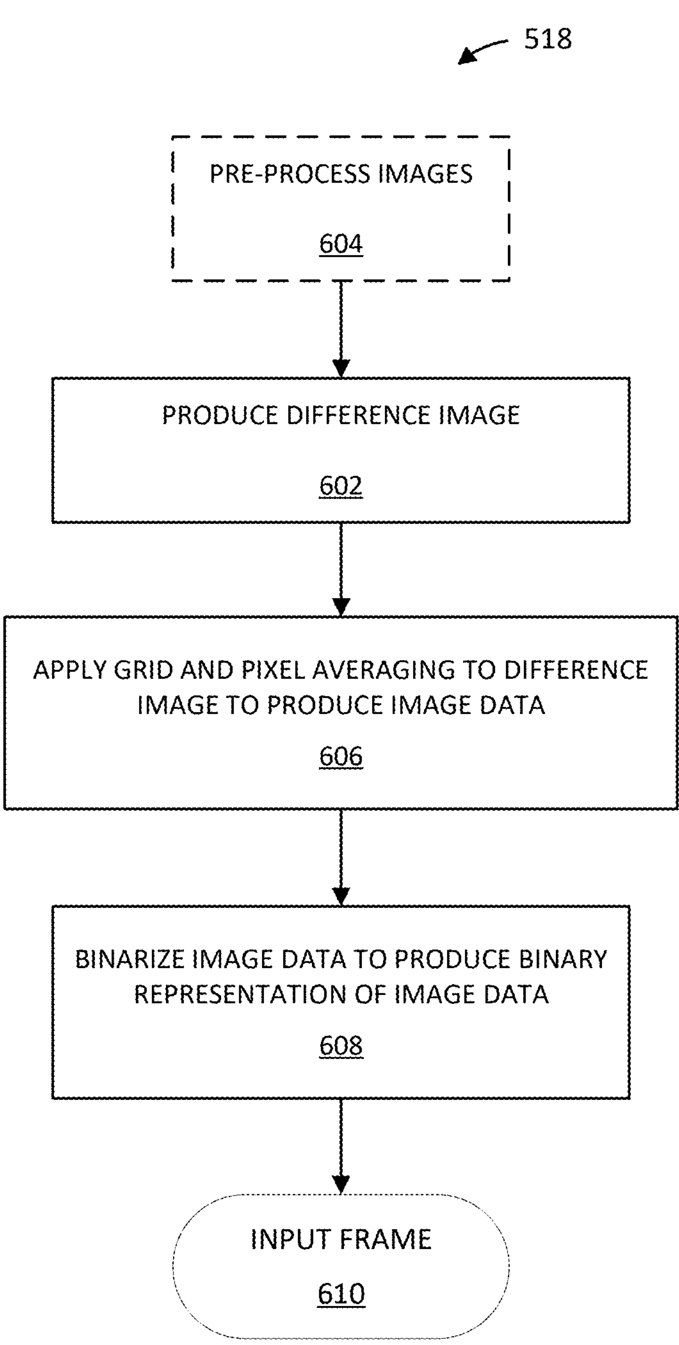
FIG. 6 is a flow diagram of aspects of an example of the method of FIG. 5B, according to some examples described herein.

Turning to FIG. 6, there is illustrated a flow diagram of an example of the operation 518 of producing input frames (binary representations of image data) which may be further processed according to the method of FIG. 5B.

At operation 602, a difference image is produced through a pixel-to-pixel comparison of two images 504. In some examples, the images 504 are sequential images acquired by the image capture device 110. For example, the image capture device 110 may capture video data—represented as a temporally-ordered sequence 502 of image frames, in which individual frames may be adjacent to a prior and/or subsequently captured image frame. In other examples, the image capture device 110 may capture a sequence 502 of still images.

Figure 7:
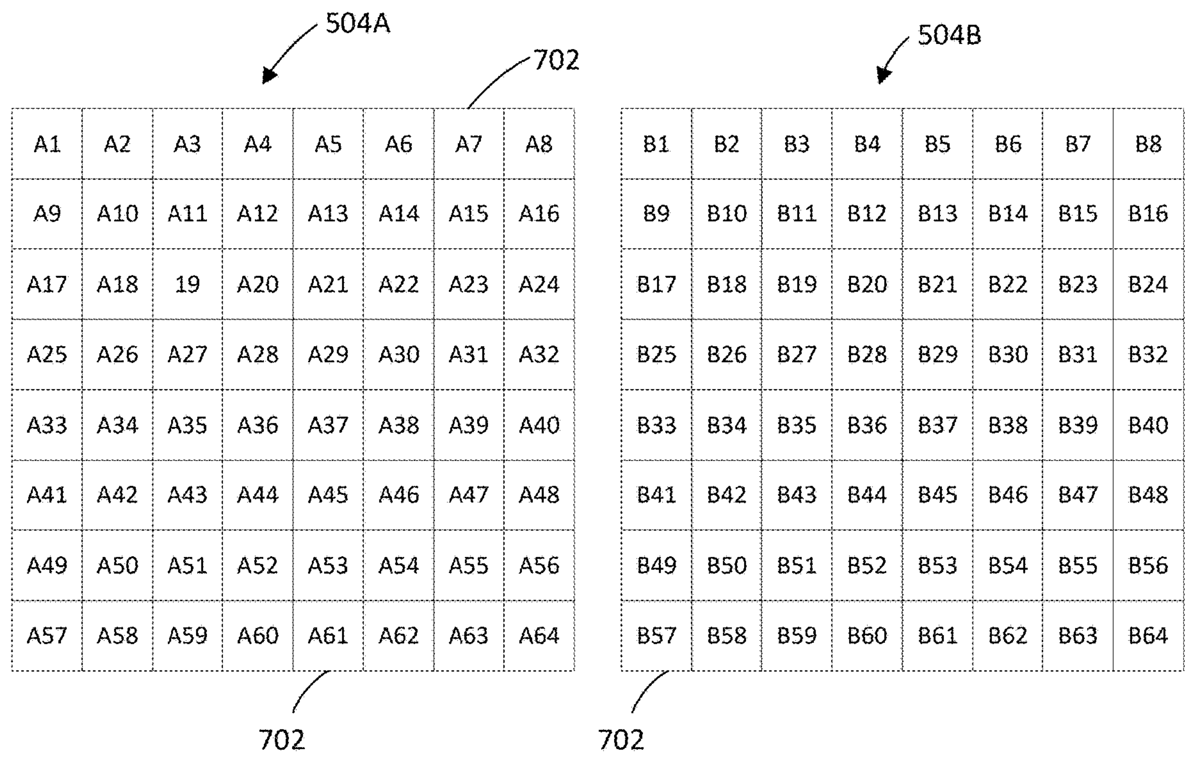
FIG. 7 is a diagram illustrating a pair of images, according to some examples described herein.

FIG. 7 illustrates an example of two images 504A, 504B that can be used to produce a difference image 802 (an example of which is illustrated in FIG. 8) at operation 602. As shown in FIG. 7, individual images 504A, 504B include a plurality of individual pixels 702 arranged in a two-dimensional grid/array of rows and columns. The pixels 702 have intensity values representing the content of the respective image. In the illustrated example, the pixels 702 of the first image 504A have respective intensity values A1-A64, and the pixels 702 of the second image 504B have respective intensity values B1-B64. In some cases, the first image 504A and the second image 504B may be adjacent or sequential images captured by the image capture device 110 of FIG. 1. It will be appreciated that while the example illustrated in FIG. 7 shows the images 504A, 504B having 64 pixels 702 each, the images 504A, 504B may include any number of pixels 702, and in some examples may include many hundreds or thousands of pixels.

In some examples, the image capture device 110 may obtain color images of a viewed scene. In some such examples, an operation 604 of pre-processing the images 504A, 504B includes converting the images to greyscale, so as to produce at least two consecutive greyscale images that can be compared to produce the difference image. An advantage to using greyscale images is that variations in brightness that are due to color settings (and not related to motion), or other offsets and/or errors due to color can create false positive indications of motion. Converting the frames to greyscale prior to further processing can thus help avoid falsely detecting motion due changes in color or lighting, rather than movement of objects in the frame.

In addition, in some examples, operation 604 of pre-processing includes resizing the images 504A, 504B. For example, the image capture device 110 may capture or otherwise obtain images that have relatively high resolution, and therefore larger size; however, this resolution may not be needed for accurate motion detection of objects of interest (e.g., individuals) or for other processing applied to the images. Larger images represent more data, and thus may require more time and/or processing power to be processed to detect motion, for example. Accordingly, in some examples, at operation 604, the images may be downsampled or otherwise resized to reduce the storage capacity used to store the images (e.g., in a temporary buffer, as described further below) and/or the computational load associated with processing the images (e.g., to produce the difference image 800 at operation 602).

As described above, operation 602 includes comparing adjacent, optionally downsampled or otherwise pre-processed, images 504A, 504B to identify differences between the intensities of the pixels of adjacent images. This comparison produces the difference image 802. Referring to FIG. 8, an example of the difference image 802 derived from the pair of images 504A, 504B of FIG. 7 is illustrated. The difference image 802 has pixels 804 which respectively have values D1-D64, wherein Dn=the absolute value of An-Bn (i.e., the difference between the intensities of pixels 702 at the same (corresponding) locations in images 504A and 504B). The difference image 802 has the same number of pixels 804 as do the underlying images 504A, 504B from which it is produced.

Returning to FIG. 6, at operation 606, the difference image 802 produced at operation 602 is processed by applying a grid and pixel averaging to produce a frame of image data. In particular, according to certain examples, the pixels 804 of the difference image 802 are grouped into "tiles" according to a grid pattern; referred to as "tiling" the difference image. Each tile represents a block of pixels 804. For example, the difference image 802 may be tiled using a tile size of N×N pixels, where N is an integer number of pixels. For example, N may be 4, 8, 16, etc. In other examples, the difference image 802 may be tiled using a tile size of N×M, where N and M are different integer numbers of pixels.

Figure 9:
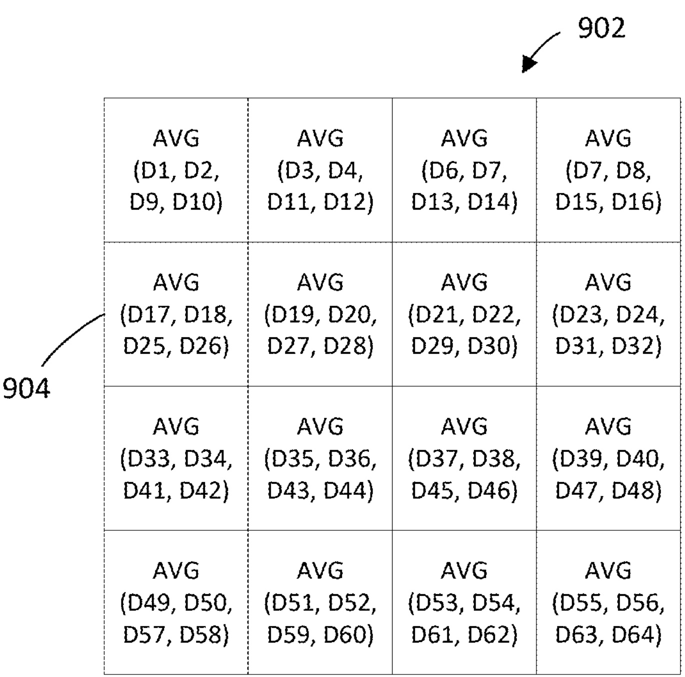
FIG. 9 is a diagram illustrating a data set derived from the difference image of FIG. 8, according to some examples described herein.

In some examples, individual tiles have a value that is the average value of all the pixels (e.g., intensity values) within a given tile. FIG. 9 illustrates an example of a frame of image data 902 derived from the difference image 802 of FIG. 8. The frame of image data 902 is composed of tiles 904. Individual tiles 904 have a value that is equal to the average of the values Dn of a grouping of pixels 804 of the difference image 802 that make up the tile 904. In the illustrated example, individual tiles represent a 2×2 grid of pixels 804 from the difference image 802. However, the tiles 904 may be made of groupings of pixels of any size, such as 3×3, 4×4, 8×8, 16×16, 16×9, 16×10, and/or 4×3, to give a few examples. In some instances, the tiles 904 may each be of uniform size, and in some other instances, the frame of image data 902 may be composed of tiles 904 of different sizes.

Figure 10A:
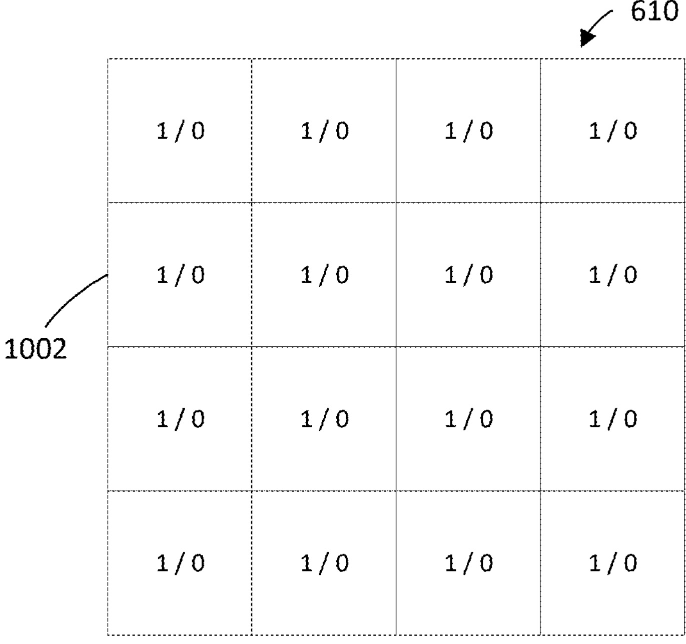
FIG. 10A is a diagram illustrating a binary representation of image data derived from the data set of FIG. 9, according to some examples described herein.
Figure 10B:
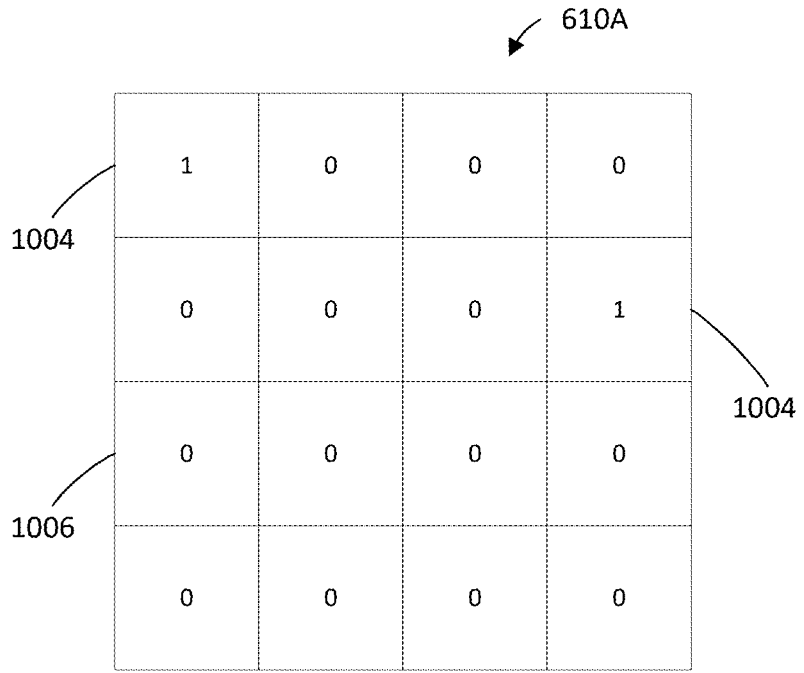
FIG. 10B is an example of the binary representation of image data of FIG. 10A, according to some examples described herein.

Referring again to FIG. 6, at operation 608, the frame of image data 902 is binarized to produce a binary representation of the image data (e.g., an input frame 610). The image data may be binarized at operation 608 by comparing the calculated value of individual tiles to a threshold (e.g., a predetermined threshold) value. For example, individual tiles 904 can be binarized according to the following function: Binarize(F(x,y)={1 if F(x, y)>Thr; 0 otherwise. In this formulation, F(x,y) represents the value of the tile 904 at coordinates x (row number) and y (column number) in the frame of image data 902, and Thr represents a particular threshold value. Thus, applying the binarization formula, in the resulting input frame 610, each tile 1002 (see FIGS. 10A and 10B) has a binary value (e.g., 0 or 1, as shown in FIG. 10A) indicating whether the corresponding tile of the frame of image data 902 has a value that is above or below the threshold. For example, referring to FIG. 10B, tiles 1004 of the input frame 602 that correspond to tiles 904 of the frame of image data 902 having values above the threshold may read '1,' while other tiles 1006 of the input frame 610 that correspond to tiles 904 of the frame of image data 902 having values below the threshold may read '0.' It will be appreciated that while logical '1' and '0' are used herein to indicate alternative binary states, the states may be distinguished by any other known method of indicating alternative states. Furthermore, it will be appreciated that the opposite convention may be used in any examples (e.g., logical "1s" can be replaced with logical "0s" and vice versa).

In the difference image 802, relatively high values, Dn, of the pixels 804 represent significant changes in the intensities of the corresponding pixels 704 between one image 504A and the next image 504B. This change in intensity can represent movement of an object across the field of view of the image capture device 110. However, motion of an object of interest (e.g., a person, vehicle, etc.) is likely to cause changes in intensity of many pixels in proximity to one another (e.g., a group of pixels) because objects of interest may tend to be relatively large and therefore depicted across many pixels in a given image 504. Fluctuations in the intensity of a single pixel on the other hand may be caused by numerous factors or events unrelated to motion of objects of interest. Accordingly, by tiling the difference image 802 to produce the frame of image data 902 in which the tiles 904 represent the average values of groups of pixels, as described above, intensity fluctuations in individual pixels can be smoothed or filtered. In the frame of image data 902, tiles 904 with relatively high values indicate that all or many of the pixels 804 in the underlying group are changing from one adjacent image 702 to another. Conversely, when the pixels 804 that make up a given tile 904 do not change significantly, or only a few pixels in the group change, the tile 904 will have a lower value. As described above, in some examples, the determined value of a tile 904 is compared to a threshold value (Thr) to produce the binarized input frame 610, where tiles 1002 of the input frame 602 corresponding to tiles 904 with a value above the threshold are assigned the value 1, while tiles 1002 corresponding to tiles 904 with a value below the threshold are assigned the value 0. In some examples, tiles 1004 may be considered "positive" tiles, whereas tiles 1006 may be considered "negative" tiles.

In some examples, higher-value tiles 904 indicate with a higher certainty that motion of interest is being detected by the image capture device 110 in those sections of the frame of image data 902 with relatively high tile values. Some tiles 904 may have relatively low or moderate values indicating some change in the pixels 702 detected between consecutive images 504A, 504B, but not enough for the average value of the pixels 804 making up the tile to bring the value of that tile above the threshold. This thresholding applied at operation 608 may thus serve to filter out small changes between images 504A, 504B from being identified as motion. Such small changes may be caused by precipitation, insects or other animals, debris, and/or distant vehicles captured by the image capture device 110, lighting changes, or "glitches" in some pixels 702, to name a few possible causes, leading to false positive indications of motion of object of interest. The threshold used in the binarization process at operation 608 may be selected to prevent 'false alarms' being triggered by motion which is not of interest to a party utilizing such a system. The threshold value may be manually set or automatically adjusted by the image capture device 110, for example.

In some examples, motion detection may be performed on the basis of individual input frames 610. For example, referring to FIG. 10B, tiles 1004 with values of logical "1" may be considered to represent areas of motion, whereas tiles 1006 with values of logical "0" may be considered to represent areas where no motion has been detected. However, in other examples, a collection or sequence of input frames 610 can be used in combination for motion detection, as described above with reference with reference to FIG. 5. This approach can assist in filtering out instances of motion detection that may be produced by small, rapidly moving objects, such as insects or precipitation, and therefore not of interest.

Figure 11:
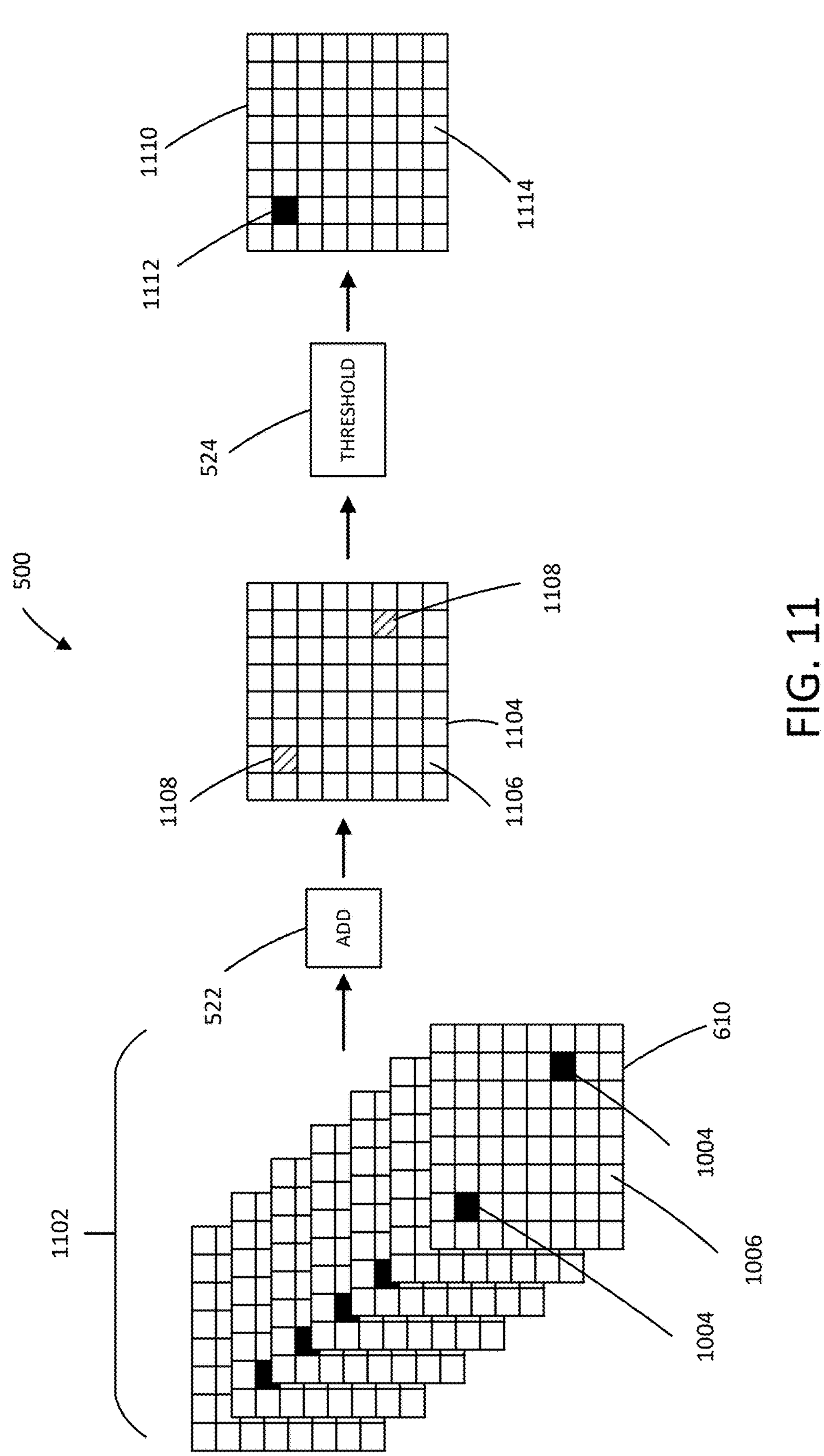
FIG. 11 is a diagram illustrating a method of image processing including temporal filtering, according to some examples described herein.

FIG. 11 provides an illustration of an implementation of the process 500 of FIG. 5, according to certain examples.

In some examples, operation 518 described above includes producing a collection, or sequence, of a plurality of input frames 610. As described above, individual input frames 610 include a plurality of tiles 1002, which are shown in FIG. 11 as either black to indicate that they are active tiles 1004 or white to indicate that they are inactive tiles 1006. In some examples, active tiles 1004 represent locations (in the respective input frame 610) of moving objects depicted in at least some of the images 504 from which the input frames 610 were derived.

Referring to FIGS. 5 and 11, once the plurality of input frames 610 have been produced at operation 602, as described above, a process of temporal filtering 520 can be applied to the collection 1102 of the input frames 610. As described above, according to certain examples, the temporal filtering 520 includes operation 522 of temporal aggregation of at least a subset of the plurality of input frames 610. In some examples, operation 522 of temporal aggregation is accomplished by taking a sum along the time axis of the sequence 1102 of input frames 610. That is, multiple input frames 610 can be summed together by adding the values of tiles 1002 in the same location over multiple input frames to produce a composite frame 1104.

Figure 12A:
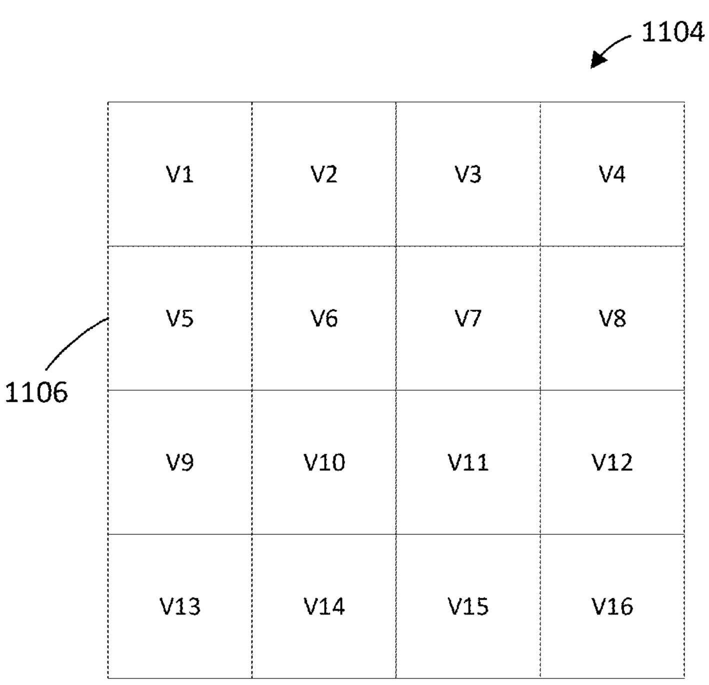
FIG. 12A is a diagram illustrating aggregated image data, according to some examples described herein.

An example of a composite frame 1104 is illustrated in FIG. 12A. Because in some examples, the input frames 610 are binary representations of image data (e.g., each tile 1002 has a binary value of 1 or 0, as described above), the sum may be found by summing the binary values of the tiles in the same location from input frames 610 collected over a period of time. As a result, and referring to FIG. 12A, individual tiles 1106 in the composite frame 1104 may have a value, Vn, in a range from 0 (all tiles at that location in the sequence of input frames have a value of 0) to N (all tiles at that location in the sequence of input frames have a value of 1), where N is the number of input frames 610 that are being summed together (aggregated).

In at least some examples, the composite frame 1104 has one or more tiles 1108 that have non-zero values, Vn, and represent the locations of the moving objects (e.g., objects 506 and/or 508) depicted in the images 504. As described above, active tiles 1004 of the input frames 610 may have binary values of 1 and represent locations of a moving object 506 or 508. Thus, in some examples, the value, Vn, of individual tiles 1106 represent the number of input frames 610 in which a moving object is represented at the location of that tile. As described above, a slow-moving object (e.g., the first object 506) may be depicted at roughly the same location in several consecutive images 504, and therefore may be represented in the same tile 1102 in several input frames 610 of the sequence 1102. In contrast, a fast-moving object (e.g., the second object 508) may only be depicted at the same location in a few images 504, and therefore may be represented in the same tile in only one or a few input frames 610. As a result of the temporal aggregation operation 522, if a moving object is represented in the same tile 1002 over many input frames 610, the value, Vn, for the corresponding tile 1106 in the composite frame 1104 will be high, indicating a relatively slow-moving object (e.g., the first object 506). On the other hand, if a moving object is represented in the same tile 1002 in only a few input frames 610, the value, Vn, for the corresponding tile 1106 in the composite frame 1104 will be lower, indicating a relatively fast-moving object (e.g., the second object 508).

In some examples, the image capture device 110 may capture the images 504 over time. At operation 518, the input frames 610 can be produced from the images 504. Thus, as more images 504 are captured over time, more input frames 610 can be produced. In some examples, temporal filtering 520 is applied to a collection 1102 of the input frames 610. Thus in some examples, the collection 1102 of input frames can be stored in a frame buffer for processing. As additional images 504 are acquired, and corresponding additional input frames 610 are produced, they can be added to the collection 1102. In some examples, to maintain a consistent number of input frames 610 in the collection 1102, older input frames 610 can be removed as new input frames 610 are produced and added. In this manner, motion detection processes can be applied to current data that is updated over time.

Figure 13:
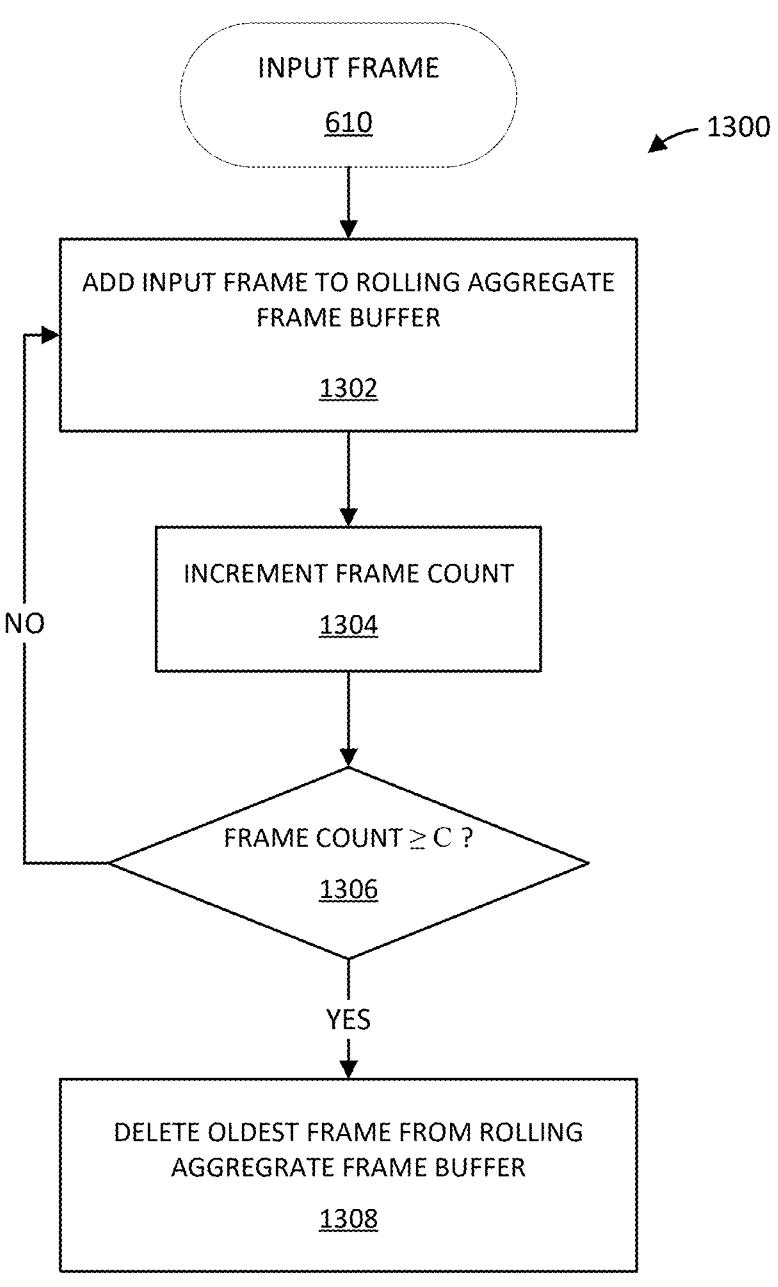
FIG. 13 is a flow diagram of a portion of a method of image processing, according to some examples described herein.

Referring to FIG. 13, there is illustrated a process 1300 of accumulating the collection 1102 of input frames 610 for processing. At operation 1302

FIG. 13 illustrates a flow diagram of a processing of a portion of a method of temporal filtering 1100 is depicted. At operation 1302, an input frame 610 is added to a rolling aggregate frame buffer. When the input frame 610 is added at operation 1302, a frame count is incremented at operation 1304. The frame count represents the number of input frames 610 in the rolling aggregate frame buffer at a given time. Once incremented at operation 1304, the frame count is compared, at operation 1306, to a capacity number C. If the frame count is less than C, another input frame 610 is added to the frame buffer at operation 1302, and the frame count is incremented again at operation 1304. The new frame count is then compared, at operation 1306, to C. This process repeats until the frame count is greater than or equal to C. When the frame count is greater than or equal to C, the oldest input frame 610 is deleted from the rolling aggregate frame buffer at operation 1308. In this way, during continued operation, the rolling aggregate frame buffer may hold a consistent number of frames within it, with new input frames 610 being added at the same rate at which older input frames are removed.

Figure 12B:
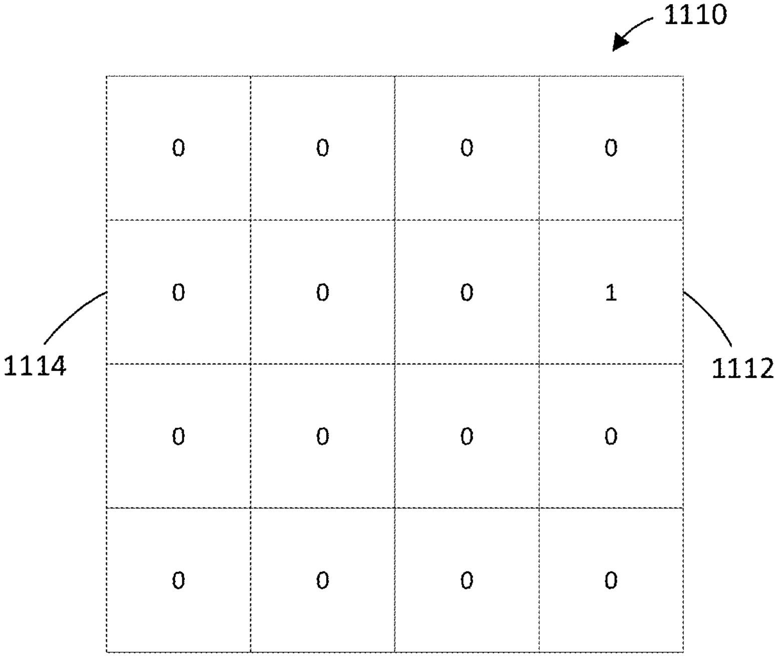
FIG. 12B is a diagram illustrating a data set produced by applying a threshold to the aggregated image data of FIG. 13A, according to some examples described herein.

Continuing with the example of FIGS. 5 and 11, after temporal aggregation at operation 522, a threshold can be applied to the aggregated image data (e.g., to the composite frame 1104) at operation 524, as described above. For example, the values, Vn, of the tiles 1106 are compared to a threshold (e.g., a predetermined threshold value), representing a minimum number of input frames 610 in which the tiles 1002 at a given location had logical values of "1" (e.g., are "positive" tiles 1004). In some examples, applying the threshold at operation 524 includes binarizing the composite frame 1104. FIG. 12B illustrates an example of a binary composite frame 1110, also referred to as a data set 1110, in which the values, Vn, of the tiles 1106 of the composite frame 1104 (e.g., shown in FIG. 12A) are replaced with either a logical "1" (e.g., tile 1112) or logical "0" (e.g., tiles 1114) depending on whether or not the value, Vn, of the respective tile 1302 exceeds the threshold.

As described above, operation 526 may include determining, for individual tiles 1106 of the composite frame 1104, whether or not the threshold value is exceeded. In some examples, the determination at operation 526 may include determining whether individual tiles 1112, 1114 of the data set 1110 have values of 0 (e.g., threshold not exceeded) or 1 (e.g., threshold met or exceeded). In some examples, determining, at operation 526, that the threshold is met or exceeded results in an instance of detected motion. For example, an output provided at state 530 may indicate that motion has been detected. In some examples, determining, at operation 526, that the threshold is not met or exceeded, does not produce an indication of detected motion. Thus, at state 528 (no motion detected), either no output may be provided, or an output indicating no meaningful motion detected may be provided.

Figure 14:
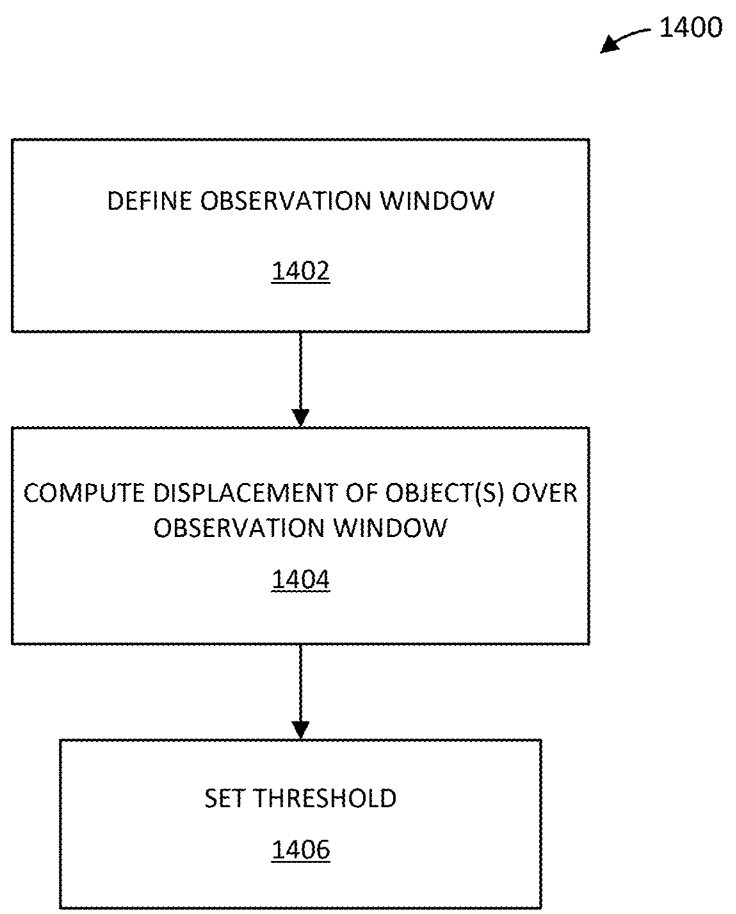
FIG. 14 is a flow diagram of a method of determining a threshold for motion detection, according to some examples described herein.

Turning now to FIG. 14, a flow diagram of a method 1400 of determining a threshold for motion detection is depicted. In some example, this threshold is the threshold used at operation 526. The method 1400 includes an operation 1402 of defining a window in which to observe moving objects (e.g., an observational window). The observational window is the grouping of input frames 610 which may be used for an instance of implementation of a method of motion detection as described herein. In some examples, the window may correspond to the sequence 1102 of input frames 610 of FIG. 11. The window may be defined in terms of time (e.g. 1 second, 5 seconds, 1 minute, etc.), in terms of size (4 frames, 10 frames, 50 frames, etc.), or both.

The method 1400 may further include an operation 1404 of computing the displacement of objects over the duration of the observation window. From the perspective of a camera capturing a sequence 1102 of images, an object in motion may move across the camera's field of view, as described above. The displacement of the object may be shown by differing positions of the object between different images 504 of the sequence 502 of images 504 acquired by the image capture device 110. Faster-moving objects will have a larger displacement than slower-moving objects (i.e., faster-moving objects will shift by more pixels between adjacent images). The cumulative displacement of an object may be found using the following formula, where the centroid of the object in question for an image taken at time t is defined as $(x_t, y_t)$.

$$\text{Cumulative Displacement} = \sum_{i=0}^{n} \sqrt{(x_t - x_{t-i})^2 + (y_t - y_{t-i})^2}$$

Once the displacement of the object is determined, a threshold is set at operation 1406 in order to differentiate between fast-moving and slow-moving objects. The threshold may be set to conform to the following behavior:

Speed(Object)={Fast if Cumulative Displacement>Thr;Slow

The speed of the object moving across the field of view (FOV) of the image capture device 110 may be determined using a calculation derived from the displacement determined above. The FOV forms an angle θ from the center to the edge of the FOV, and the distance from the camera to the object is $d_{obj}$, the camera resolution is W×H pixels. After the images 504 are resized (e.g., at operation 604 described above, and the difference image is produced at operation 602, the difference image 802 may have a size $(W_d \times H_d)$. The difference image 802 may be further downsampled (e.g., tiled in operation 606 as described above to a grid size of $W_g \times H_g$ tiles, in which each tile represents an average value of $W_s \times H_s$ pixels, as described above.

The horizontal FOV $(\theta_{lr})$ can be derived if θ is known for half the horizontal FOV, i.e. $\theta_{lr}=2*\theta$. The motion in the $W_g \times H_g$ grid when mapped to the physical movement in the scene, each horizontal tile represents a segment of the horizontal FOV. For each movement in $W_g \times H_g$ grid, the horizontal displacement can be defined as $\Delta x = d_{obj} * \tan(\theta_{lr}/W_g)$ where $\theta_{lr}/W_g$ can be denoted as $\Delta\theta_{lr}$.

The physical displacement for one time movement along the horizontal direction is $$\Delta x = d_{obj} * \tan(\Delta\theta_{lr}).$$

Finally, the total displacement over n frames where $\Delta x_t$ is the displacement in pixels at image time t can be defined as:

$$\Delta X = \sum_{i=0}^{n-1} \Delta x = \sum_{i=0}^{n-1} \left(d_{obj} * \tan\left(\Delta\theta_{lr} * W_g^i\right)\right)$$

where $W_g^i$ denotes the horizontal movement in grid units at frame i. If the frame rate of the camera is F frames per second, the time interval for n images is t=n/F. The speed of the object is then given by:

Speed=Total Horizontal Displacement/$t$

The same can be extended to objects moving from top to bottom. The vertical FOV($\theta_{tb}$) can be derived if θ is known for half the vertical FOV, i.e. $\theta_{tb}=2*\theta$. The vertical displacement can be found as $$D_{tb}=d*\tan(\theta_{tb}/H_g)$$

where $\theta_{tb}/H_g$ can be denoted as $\Delta\theta_{tr}$. The physical displacement for one time movement along the horizontal direction $$\Delta y=d_{obj}*\tan(\Delta\theta_{tb}).$$

Finally, the total displacement over n frames where $4y_t$ is the displacement in pixels at image time t can be defined as:

$$\Delta Y = \sum_{i=0}^{n-1} \Delta y = \sum_{i=0}^{n-1} \left(d_{obj} * \tan\left(\Delta\theta_{lr} * H_g^i\right)\right)$$

where $H_g^i$ denotes the vertical movement in grid units at image i.

Using these calculations, the relative speed of objects across the field of view of the image capture device 110 can be translated into the expected displacement (in number of pixels) from one acquired image 504 (e.g., image 504A) to the next (e.g., image 504B). Accordingly, the threshold used at operation 526 can be selected, such that objects moving across the field of view at or above a particular speed are processed (e.g., filtered) out.

Figure 15:
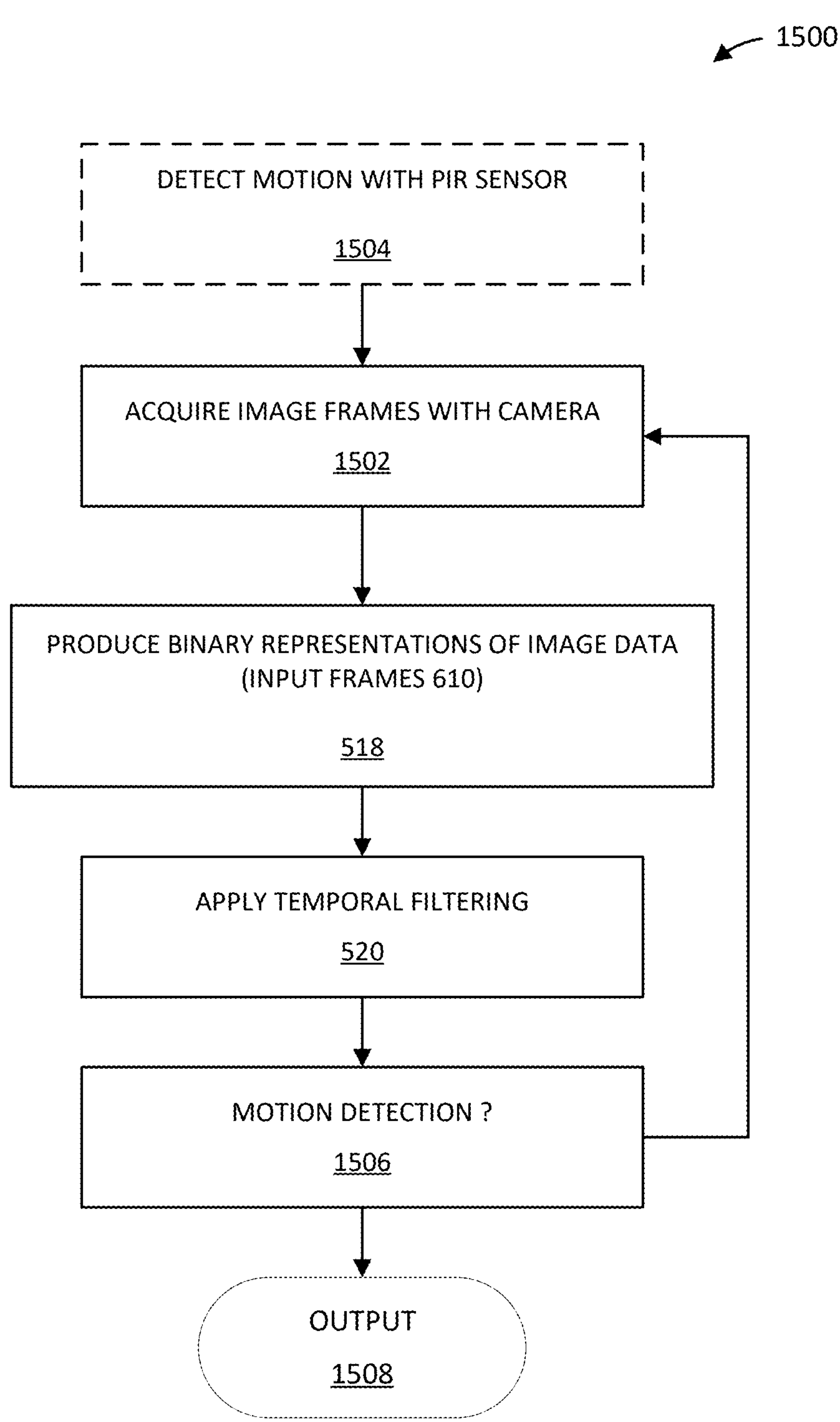
FIG. 15 is a flow diagram of a method of motion detection, according to some examples described herein.

Referring to FIG. 15, illustrated is a flow diagram of a method of motion detection 1500 implementing speed-based filtering according to examples described herein.

The method includes an operation 1502 of acquiring a plurality of images 504 using the image capture device 110.

As described above in some examples, in some examples, the image capture device 110 may operate in a low-power state (low-power operating mode) in which the image sensor 424 (and optionally other components of the image capture device 110) are deactivated until motion is detected by the PIR sensor 422. Accordingly, in some examples, the method 1500 may include an operation 1504 of detecting motion with the PIR sensor 422. When the PIR sensor 422 detects motion at operation 1504, the image sensor 424 can be activated, and the plurality of images 504 can be acquired at operation 1502.

At operation 518, the input frames 610 can be produced from the images 504, as described above with reference to FIG. 6. At operation 520, temporal filtering can be applied to a collection of the input frames, as described above with reference to FIGS. 5B-14. This process allows fast-moving objects to be processed (e.g., filtered) out of the data set that is processed for motion detection, thereby reducing instances of false alerts caused by detecting the motion of nuisance objects such as precipitation, insects, or dust, as described above.

A motion detection determination may be applied to the filtered data set at operation 1506. For example, as described above, this determination at operation 1506 may include determining which, if any, tiles 1112 of the data set 1110 (derived from the composite frame 1104 produced at operation 518) have a value of logical 1 representing a location of a potential moving object of interest. An output 1508 may indicate whether or not motion is detected at operation 1506. For example, if motion is detected at operation 1506, the output 1508 may include an alert or other notification.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and aspects discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

Descriptions of additional examples follow. Other variations will be apparent in light of this disclosure.

Example 1 is a method comprising: aggregating two or more frames of a sequence of frames to produce a composite frame, the composite frame representing movement of a plurality of objects at different velocities; generating, from the composite frame a data set representing locations in the frames of one or more of the objects that are moving at a velocity below a limit; identifying from the data set at least one object of interest from among the one or more objects; and causing a security device to issue an alert responsive to identifying the at least one object of interest.

Example 2 includes the method of Example 1, wherein generating the data set comprises filtering the composite frame by applying a threshold to the composite frame.

Example 3 includes the method of one of Examples 1 or 2, further comprising producing the sequence of frames from a plurality of images, individual frames within the sequence of frames having tiles derived from groupings of pixels of individual images within the plurality of images, and storing the two or more frames in a frame buffer.

Example 4 includes the method of Example 3, further comprising determining a speed of displacement of an object across the plurality of images; and determining the threshold based at least in part on the speed of displacement.

Example 5 includes the method of one of Examples 3 or 4, wherein producing the sequence of frames comprises, for each frame, processing a plurality of consecutive images from the plurality of images.

Example 6 includes the method of Example 5, wherein producing the frames comprises, for each frame: producing from first and second consecutive images of the plurality of images, a third image having pixels with intensity values that represent a magnitude of a difference in intensity values between respective pairs of pixels of the first and second mages, each respective pair of pixels being one pixel from each of the first and second images and present at the same locations within their respective images; grouping pixels of the third image into a plurality of tiles, individual tiles of the plurality of tiles including a plurality of the pixels in the third image; summing the intensity values of the plurality of the pixels in individual tiles to produce a summed value for the respective tile; and producing the frame by converting respective summed values for the individual tiles to binary values based on whether the respective summed values exceed a threshold value.

Example 7 includes the method of Example 6, further comprising: prior to the third image, downsizing the first and second consecutive images.

Example 8 includes the method of any one of Examples 3-7, further comprising acquiring the plurality of images with a camera.

Example 9 includes the method of Example 8, further comprising activating, based on detecting motion with a sensor, the camera to acquire the plurality of images.

Example 10 is a device configured to implement the method from any of Examples 1-9.

Example 11 is a device comprising: a camera, a frame buffer, a processor, and a non-transitory data storage device storing instructions that, when executed by the processor, cause the device to: aggregate two or more frames of a sequence of frames to produce a composite frame, the composite frame representing movement of a plurality of objects at different velocities, and the sequence of frames containing data derived from a plurality of images acquired by the camera; apply a threshold to the composite frame to produce a data set, the data set representing locations in the images of one or more of the objects that are moving at a velocity below a limit; and identify from the data set at least one object of interest from among the one or more objects.

Example 12 includes the device of Example 11, wherein the data storage device further stores instructions that when executed by the processor cause the device to produce the plurality of frames by, for east respective frame: producing from first and second consecutive images of the plurality of images, a third image having pixels with intensity values that represent a magnitude of a difference in intensity values between respective pairs of pixels of the first and second images, each respective pair of pixels being one pixel from each of the first and second image and present at the same locations within their respective images; grouping pixels of the third images into a plurality of tiles, individual tiles of the plurality of tiles including a plurality of the pixels of the third image; summing the intensity values of the plurality of the pixels in individual tiles to produce a summed value for each respective tile; and producing the respective frame by converting summed values of the individual tiles to binary values based on whether the respective summed values exceed a threshold value.

Example 13 includes the device of one of Examples 11 or 12, further comprising a sensor; wherein the data storage device further stores instructions that when executed by the processor cause the device to activate, based on detecting motion with the sensor, the camera to acquire the plurality of images.

Example 14 includes the device of any one of Examples 11-13, wherein the data storage device further stores instructions that when executed by the processor cause the device to: determine a speed of displacement of an object across the plurality of images; and determine the threshold based at least in part on the speed of displacement.

Example 15 is a method comprising: acquiring, with a camera, a plurality of images; producing, based on the plurality of images, a sequence of frames, individual frames having a plurality of first tiles with binary values derived from groupings of pixels of consecutive pairs of images from the plurality of images; summing the sequence of frames to produce a composite frame having a plurality of second tiles; comparing the values of the plurality of second tiles of the composite frame to a threshold; and detecting, based on the value of at least one second tile of the composite frame exceeding the threshold, a moving object depicted in one or more images of the plurality of images.

Example 16 includes the method of Example 15, further comprising determining a speed of displacement of an object across the plurality of images; and determining the threshold based at least in part on the speed of displacement.

Example 17 includes the method of one of Examples 15 or 16, wherein producing the sequence of frames comprises, for each frame: producing from first and second consecutive images of the plurality of images, a third image having pixels with intensity values that represent a magnitude of a difference in intensity values between respective pairs of pixels of the first and second images, each respective pair of pixels being one pixel from each of first and second images and present at the same locations within their respective images; grouping pixels of the third image into a plurality of third tiles, individual third tiles of the plurality of third tiles including a plurality of the pixels of the third image; summing the intensity values of the plurality of the pixels in individual third tiles to produce a summed value for the respective third tile; and producing the frame by converting respective summed values for the individual third tiles to the binary values of the first tiles based on whether the respective summed values exceed a threshold value.

Example 18 includes the method of Example 17, further comprising, prior to producing the third image, downsizing the first and second consecutive images.

Example 19 includes the method of any one of Examples 15-18, further comprising storing the sequence of frames in a frame buffer.

Example 20 includes the method of Example 19, further comprising: determining whether a number of frames in the sequence of frames is equal to a capacity of the frame buffer; and storing an additional frame in the frame buffer in response to the number of frames in the sequence of frames being less than the capacity of the frame buffer.

Example 21 includes the method of any one of Examples 15-20, further comprising activating, based on detecting motion with a sensor, the camera to acquire the plurality of images.

Example 22 is a device configured to implement the method of any one of Examples 15-21.

Example 23 is a method comprising: summing two or more input frames from a sequence of input frames to produce aggregated image data, individual input frames of the sequence of input frames being binary representations of image data; filtering the aggregated image data by applying a threshold for motion detection to the aggregated image data to produce a filtered data set; and identifying, based on values of one or more tiles of the filtered data set exceeding the threshold, a moving object represented in the image data.

Example 24 includes the method of Example 23, further comprising producing the sequence of input frames based on a sequence of images.

Example 25 includes the method of Example 24, further comprising determining a speed of displacement of an object across the sequence of images; and determining the threshold based at least in part on the speed of displacement.

Example 26 includes the method of one of Examples 24 or 25, wherein producing the sequence of input frames comprises, for each input frame: producing from first and second consecutive images of the sequence of images, a third image having pixels with intensity values that represent a magnitude of a difference in intensity values between respective pairs of pixels of the first and second images, each respective pair of pixels being one pixel from each of first and second images and present at the same locations within their respective images; grouping pixels of the third image into a plurality of tiles, individual tiles of the plurality of tiles including a plurality of the pixels of the third image; summing the intensity values of the plurality of the pixels in individual tiles to produce a summed value for the respective tile; and producing the input frame by converting respective summed values for the individual tiles to binary values based on whether the respective summed values exceed a threshold value.

Example 27 is a device comprising: a frame buffer configured to store the two or more input frames, a processor, and a non-transitory computer-readable data storage device storing instructions that, when executed by the processor, cause the device to perform the method of any one of Examples 24-26.

Example 28 is a method comprising: acquiring, with a camera, a plurality of images; producing, based on the plurality of images, a sequence of input frames that are binary representations of image data derived from the plurality of images; applying temporal filtering to the sequence of input frames, the temporal filtering including (i) summing at least a subset of the sequence of input frames to produce aggregated image data, and (ii) comparing values of tiles of the aggregated image data to a threshold; and detecting, based on the value of at least one tile of the aggregated image data exceeding the threshold, a moving object depicted in one or more images of the plurality of images.

Example 29 includes the method of Example 28, further comprising: determining a speed of displacement of an object across a plurality of consecutive image frames acquired with the camera; and determining the threshold based at least in part on the speed of displacement.

Example 30 includes the method of one of Examples 28 or 29, wherein producing the sequence of input frame comprises, for each input frame: producing from first and second consecutive images of the plurality of images, a third image having pixels with intensity values that represent a magnitude of a difference in intensity values between respective pairs of pixels of the first and second images, each respective pair of pixels being one pixel from each of first and second images and present at the same locations within their respective images; grouping pixels of the third image into a plurality of tiles, individual tiles of the plurality of tiles including a plurality of the pixels of the third image; summing the intensity values of the plurality of the pixels in individual tiles to produce a summed value for the respective tile; and producing the input frame by converting respective summed values for the individual tiles to binary values based on whether the respective summed values exceed a threshold value.

Example 31 includes the method of Example 30, further comprising, prior to producing the third image, downsizing the first and second consecutive images.

Example 32 includes the method of any one of Examples 28-31, further comprising storing the subset of the sequence of input frames in a frame buffer.

Example 33 includes the method of Example 32, further comprising determining whether a number of input frames in the subset of the sequence of input frames is equal to a capacity of the frame buffer; and storing an additional input frame from the sequence of input frames in the frame buffer based on the number of input frames in the subset being less than the capacity of the frame buffer.

Example 34 includes the method of any one of Examples 28-33, further comprising activating, responsive to detecting motion with a sensor, the camera to acquire the plurality of images.

Example 35 is a method comprising: aggregating two or more frames from a time sequence of frames to produce image data, individual frames of the sequence being binary representations of images in which tiles of an individual frame have binary values, respective tiles being groups of pixels of the images; filtering the image data by applying a threshold for motion detection to the image data to produce a data set; and identifying, based on values of one or more tiles of the data set exceeding the threshold, movement of an object represented in the image data.

Example 36 includes the method of Example 35, further comprising: acquiring the sequence of frames; and storing the two or more frames in a frame buffer.

Example 37 includes the method of one of Examples 35 or 36, further comprising: producing the sequence of frames based on a plurality of images acquired over time.

Example 38 includes the method of Example 37, further comprising: determining a speed of displacement of an object across the plurality of images; and determining the threshold based at least in part on the speed of displacement.

Example 39 includes the method of one of Examples 37 or 38, wherein producing the sequence of frames comprises, for individual frames: producing from first and second consecutive images of the plurality of images, a third image having pixels with intensity values that represent a magnitude of a difference in intensity values between respective pairs of pixels of the first and second images, the respective pairs of pixels being one pixel from the first image and one pixel from the second image present at the same locations within their respective images; grouping pixels of the third image into a plurality of tiles, individual tiles of the plurality of tiles including a plurality of the pixels of the third image; summing the intensity values of the plurality of the pixels in the individual tiles to produce a summed value for the respective tile; and producing the frame by converting respective summed values for the individual tiles to the binary values based on whether the respective summed values exceed a threshold value.

Example 40 includes the method of Example 39, further comprising: prior to producing the third image, downsizing the first and second consecutive images.

Example 41 includes the method of one of Examples 37-40, further comprising: acquiring the plurality of images with a camera.

Example 42 includes the method of Example 41, further comprising: activating, based on detecting motion with a sensor, the camera to acquire the plurality of images.

Example 43 is a method performed by a camera, the method comprising: acquiring, with the camera, a plurality of images; producing, based on the plurality of images, a sequence of frames that are binary representations of image data derived from the plurality of images, individual frames comprising a plurality of tiles, respective tiles representing groupings of pixels from the image data; applying filtering to the sequence of frames, the filtering including (i) aggregating at least a subset of the sequence of frames to produce an aggregation, and (ii) comparing values of tiles of the aggregation to a threshold; and detecting, based on the value of at least one tile of the aggregation exceeding the threshold, movement of an object depicted in two or more images of the plurality of images.

Example 44 includes the method of Example 43, further comprising: determining a speed of displacement of an object across a plurality of consecutive image frames acquired with the camera; and determining the threshold based at least in part on the speed of displacement.

Example 45 includes the method of any one of Examples 43-44, wherein producing the sequence of frames comprises, for individual frames: producing from first and second consecutive images of the plurality of images, a third image having pixels with intensity values that represent a magnitude of a difference in intensity values between respective pairs of pixels of the first and second images, the respective pairs of pixels being one pixel from the first image and one pixel from the second image present at the same locations within their respective images; grouping pixels of the third image into a plurality of tiles, individual tiles of the plurality of tiles including a plurality of the pixels of the third image; summing the intensity values of the plurality of the pixels in individual tiles to produce a summed value for the respective tile; and producing the individual frame by converting respective summed values for the individual tiles to binary values based on whether the respective summed values exceed a threshold value.

Example 46 includes the method of Example 45, further comprising: prior to producing the third image, downsizing the first and second consecutive images.

Example 47 includes the method of any one of Examples 44-46, further comprising storing the subset of the sequence of frames in a frame buffer of the camera.

Example 48 includes the method of Example 47, further comprising: determining whether a number of frames in the subset of the sequence of frames is equal to a capacity of the frame buffer; and storing an additional frame from the sequence of frames in the frame buffer based on the number of frames in the subset being less than the capacity of the frame buffer.

Example 49 includes the method of any one of Examples 44-48, further comprising: activating, based on detecting motion with a sensor, the camera to acquire the plurality of images.

Example 50 is a device comprising: a frame buffer; a processor; and a non-transitory data storage device storing instructions that when executed by the at least one processor cause the device to aggregate a plurality of frames stored in the frame buffer to produce a data set, individual frames of the plurality of frames being binary representations of image data derived from a plurality of images and in which tiles of an individual frame have binary values, respective tiles representing groups of pixels from the image data, filter the data set by applying a threshold for motion detection to the data set to produce a representation of the image data; and identify, based on values of one or more tiles of the representation of the image data exceeding the threshold, movement of an object depicted in at least some of the plurality of images.

Example 51 includes the device of Example 50, wherein the data storage device further stores instructions that when executed by the at least one processor cause the device to produce the plurality of frames by, for respective frames: produce from first and second consecutive images, a third image having pixels with intensity values that represent a magnitude of a difference in intensity values between respective pairs of pixels of the first and second images, the respective pairs of pixels being one pixel from the first image and one pixel from the second image present at the same locations within their respective images; group pixels of the third image into a plurality of tiles, individual tiles of the plurality of tiles including a plurality of the pixels of the third image; sum the intensity values of the plurality of the pixels in individual tiles to produce summed values for the individual tiles; and produce the respective frame by converting the summed values of the individual tiles to binary values based on whether the respective summed values exceed a threshold value.

Example 52 includes the device of one of Examples 50 or 51, wherein the data storage device further stores instructions that when executed by the at least one processor cause the device to, prior to producing the third image, downsize the first and second consecutive images.

Example 53 includes the device of any one of Examples 50-52, further comprising an image sensor configured to acquire the first and second consecutive images.

Example 54 includes the device of any one of Examples 50-53, wherein the instructions include instructions that when executed by the at least one processor cause the device to determine whether a number of the plurality of frames stored in the frame buffer is equal to a capacity of the frame buffer; and store an additional frame in the frame buffer based on the number of the plurality of frames being less than the capacity of the frame buffer.

Example 55 is a method comprising: aggregating two or more frames of a sequence of frames to produce aggregated image data, the aggregated image data representing movement of a plurality of objects at different velocities, and individual frames of the sequence including tiles that represent data derived from groupings of pixels of images from which the frames are produced, at least some of the tiles representing different objects of the plurality of objects; filtering the aggregated image data by applying a threshold to the aggregated image data to produce a data set, the data set representing locations in the images of a subset of the different objects moving at a velocity below a limit; and identifying, based on the subset of the different objects represented in the data set, at least one object of interest.

Example 56 is a method of motion detection comprising: aggregating a collection of binary matrices derived from images taken with a camera to produce a composite matrix; applying a threshold for motion detection to the composite matrix by comparing values of individual elements of the composite matrix to the threshold; indicating motion detection based on the value of at least one element of the composite matrix exceeding the threshold.

Example 57 is a method comprising: aggregating image data derived from a time sequence of images; and temporally filtering the aggregated image data to filter out one or more moving objects depicted in at least one image of the sequence of images, the one or more moving objects moving at a velocity greater than a specified limit velocity.

Example 58 is a method comprising applying temporal filtering to a time sequence of images to limit motion detection, based on the images, to objects moving with a velocity below a certain threshold velocity.

As will be appreciated in light of this disclosure, modifications are possible in the described examples, and other examples are possible, within the scope of the claims.

Examples disclosed herein may be combined with other examples in any manner consistent with at least one of the principles disclosed herein, and references to “an example,” “some examples,” “an alternate example,” “various examples,” “one example” or the like are not necessarily mutually exclusive and are intended to indicate that a particular aspect, structure, or characteristic described may be included in at least one example. The appearances of such terms herein are not necessarily all referring to the same example.

What is claimed is:

1. A method comprising:

aggregating a sequence of N frames by summing values of tiles in the N frames present at the same locations within their respective frames to produce a composite frame, the composite frame representing movement of a plurality of objects at different velocities, wherein N is an integer number greater than 1, and wherein the values of the tiles in individual frames are zero or 1;

generating, by applying a threshold to the composite frame, a data set representing locations in the frames of one or more of the objects that are moving at a velocity below a limit, the threshold being a number in a range of 1 to N;

identifying from the data set at least one object of interest from among the one or more objects; and causing a security device to issue an alert responsive to identifying the at least one object of interest.

2. The method of claim 1, wherein generating the data set comprises filtering the composite frame to exclude tiles of the composite frame having summed values that are below the threshold.

3. The method of claim 2, further comprising:

producing the sequence of N frames from a plurality of images, the values of the tiles of the individual frames within the sequence of N frames being derived from groupings of pixels of individual images within the plurality of images; and storing the N frames in a frame buffer.

4. The method of claim 3, further comprising:

determining a speed of displacement of an object across the plurality of images; and determining the threshold based at least in part on the speed of displacement.

5. The method of claim 3, wherein producing the sequence of N frames comprises, for each frame:

processing a plurality of consecutive images from the plurality of images.

6. The method of claim 5, wherein producing the sequence of N frames comprises, for each frame:

producing from first and second consecutive images of the plurality of images, a third image having pixels with intensity values that represent a magnitude of a difference in intensity values between respective pairs of pixels of the first and second images, each respective pair of pixels being one pixel from each of first and second images and present at the same locations within their respective images;

grouping pixels of the third image into a plurality of tiles, individual tiles of the plurality of tiles including a plurality of the pixels of the third image;

summing the intensity values of the plurality of the pixels in individual tiles to produce a summed value for the respective tile; and producing the frame by converting respective summed values for the individual tiles to zero or 1 based on whether the respective summed values exceed a threshold value.

7. The method of claim 6, further comprising:

prior to producing the third image, downsizing the first and second consecutive images.

8. The method of claim 3, further comprising:

acquiring the plurality of images with a camera.

9. The method of claim 8, further comprising:

activating, responsive to detecting motion with a sensor, the camera to acquire the plurality of images.

10. A device comprising:

a camera;

a frame buffer;

a processor; and a non-transitory data storage device storing instructions that when executed by the processor cause the device to aggregate a sequence of N frames by summing values of tiles in the N frames present at the same locations within their respective frames to produce a composite frame, the composite frame representing movement of a plurality of objects at different velocities, wherein N is an integer number greater than 1, the values of the tiles in individual frames are zero or 1, and the sequence of N frames contains data derived from a plurality of images acquired by the camera, apply a threshold to the composite frame to produce a data set, the data set representing locations in the images of one or more of the objects that are moving at a velocity below a limit, wherein the threshold is a number in a range of 1 to N, and identify from the data set at least one object of interest from among the one or more objects.

11. The device of claim 10, wherein the data storage device further stores instructions that when executed by the processor cause the device to produce the sequence of N frames by, for each respective frame:

producing from first and second consecutive images of the plurality of images, a third image having pixels with intensity values that represent a magnitude of a difference in intensity values between respective pairs of pixels of the first and second images, each respective pair of pixels being one pixel from each of first and second images and present at the same locations within their respective images;

grouping pixels of the third image into a plurality of tiles, individual tiles of the plurality of tiles including a plurality of the pixels of the third image;

summing the intensity values of the plurality of the pixels in individual tiles to produce a summed value for each respective tile; and producing the respective frame by converting summed values of the individual tiles to zero or 1 based on whether the respective summed values exceed a threshold value.

12. The device of claim 10, further comprising a sensor;

wherein the data storage device further stores instructions that when executed by the processor cause the device to activate, based on detecting motion with the sensor, the camera to acquire the plurality of images.

13. The device of claim 10, wherein the data storage device further stores instructions that when executed by the processor cause the device to:

determine a speed of displacement of an object across the plurality of images; and determine the threshold based at least in part on the speed of displacement.

14. A method comprising:

acquiring, with a camera, a plurality of images;

producing, based on the plurality of images, a sequence of N frames, N being an integer number greater than 1, and individual frames having a plurality of first tiles with binary values of zero or 1 derived from groupings of pixels of consecutive pairs of images from the plurality of images;

summing the binary values of the first tiles present at the same locations within respective frames over the sequence of N frames to produce a composite frame having a plurality of second tiles;

comparing values of the plurality of second tiles of the composite frame to a threshold, the threshold being a number in a range of 1 to N; and detecting, based on the value of at least one second tile of the composite frame exceeding the threshold, a moving object depicted in one or more images of the plurality of images.

15. The method of claim 14, further comprising:

determining a speed of displacement of an object across the plurality of images; and determining the threshold based at least in part on the speed of displacement.

16. The method of claim 14, wherein producing the sequence of N frames comprises, for each frame:

producing from first and second consecutive images of the plurality of images, a third image having pixels with intensity values that represent a magnitude of a difference in intensity values between respective pairs of pixels of the first and second images, each respective pair of pixels being one pixel from each of first and second images and present at the same locations within their respective images;

grouping pixels of the third image into a plurality of third tiles, individual third tiles of the plurality of third tiles including a plurality of the pixels of the third image;

summing the intensity values of the plurality of the pixels in individual third tiles to produce a summed value for the respective third tile; and producing the frame by converting respective summed values for the individual third tiles to zero or 1 based on whether the respective summed values exceed a threshold value.

17. The method of claim 16, further comprising:

prior to producing the third image, downsizing the first and second consecutive images.

18. The method of claim 14, further comprising:

storing the sequence of N frames in a frame buffer.

19. The method of claim 18, further comprising:

determining whether N is equal to a capacity of the frame buffer; and storing an additional frame in the frame buffer based on N being less than the capacity of the frame buffer.

20. The method of claim 14, further comprising:

activating, based on detecting motion with a sensor, the camera to acquire the plurality of images.

* * * * *